United States Patent
Tseng et al.

(10) Patent No.: US 8,250,278 B2
(45) Date of Patent: *Aug. 21, 2012

(54) DOCK-SPECIFIC DISPLAY MODES

(75) Inventors: Erick Tseng, San Francisco, CA (US); Jaikumar Ganesh, San Francisco, CA (US); Michael K. Chan, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/250,263

(22) Filed: Sep. 30, 2011

(65) Prior Publication Data

US 2012/0023463 A1  Jan. 26, 2012

Related U.S. Application Data

(63) Continuation of application No. 12/914,313, filed on Oct. 28, 2010.

(60) Provisional application No. 61/255,847, filed on Oct. 28, 2009.

(51) Int. Cl.
G06F 13/00 (2006.01)

(52) U.S. Cl. ......... 710/303; 710/300; 710/302; 710/304

(58) Field of Classification Search .................... 710/304
See application file for complete search history.

(56) References Cited

U.S. PATENT DOCUMENTS

| | | | | |
|---|---|---|---|---|
| 6,636,918 B1 * | 10/2003 | Aguilar et al. | ................ | 710/303 |
| 6,788,528 B2 * | 9/2004 | Enners et al. | ............ | 361/679.41 |
| 6,993,615 B2 * | 1/2006 | Falcon | ......................... | 710/303 |
| 7,103,381 B1 * | 9/2006 | Wright et al. | ................. | 455/557 |
| 7,117,286 B2 * | 10/2006 | Falcon | ......................... | 710/303 |
| 7,187,947 B1 * | 3/2007 | White et al. | ................ | 455/556.1 |
| 7,634,228 B2 * | 12/2009 | White et al. | ................. | 455/3.06 |
| 7,913,020 B2 * | 3/2011 | Acosta et al. | ................. | 710/303 |
| 8,010,728 B1 * | 8/2011 | Grady et al. | .................. | 710/303 |
| 8,047,966 B2 * | 11/2011 | Dorogusker et al. | ............. | 482/9 |
| 2003/0128504 A1 * | 7/2003 | Enners et al. | ................. | 361/683 |

(Continued)

FOREIGN PATENT DOCUMENTS

JP  2000-337911  12/2000

(Continued)

OTHER PUBLICATIONS

"Specification of the Bluetooth System"; Bluetooth SIG; Version 1.2; vol. 2; pp. 224-228.*

(Continued)

*Primary Examiner* — Ryan Stiglic
(74) *Attorney, Agent, or Firm* — Fish & Richardson P.C.

(57) ABSTRACT

In general, the subject matter described in this specification can be embodied in methods, systems, and program products. A mobile computing device is determined to have electrically coupled by physical contact with a docking system that is adapted to supply electrical power for charging the mobile computing device. The docking system is determined to be a first type of docking system from a plurality of types of docking systems. A first user interface profile that corresponds to the first type of docking system is selected from among a plurality of user interface profiles. Each of the plurality of user interface profiles corresponds to a respective type of docking system from the plurality of types of docking systems. The first user interface profile is presented by the mobile computing device in response to selection of the first user interface profile.

33 Claims, 20 Drawing Sheets

U.S. PATENT DOCUMENTS

| | | | |
|---|---|---|---|
| 2003/0172217 A1* | 9/2003 | Scott et al. ............... 710/303 |
| 2003/0172218 A1* | 9/2003 | Scott et al. ............... 710/303 |
| 2004/0024522 A1* | 2/2004 | Walker et al. ............. 701/210 |
| 2004/0098571 A1* | 5/2004 | Falcon ....................... 713/1 |
| 2004/0133345 A1 | 7/2004 | Asahara |
| 2005/0143016 A1 | 6/2005 | Becker et al. |
| 2005/0185364 A1* | 8/2005 | Bell et al. .................. 361/679 |
| 2005/0235209 A1 | 10/2005 | Morita et al. |
| 2006/0031617 A1* | 2/2006 | Falcon ....................... 710/303 |
| 2006/0036945 A1 | 2/2006 | Radtke et al. |
| 2006/0069458 A1 | 3/2006 | Lee et al. |
| 2006/0178813 A1 | 8/2006 | Chen |
| 2007/0015485 A1 | 1/2007 | DeBiasio et al. |
| 2007/0015486 A1* | 1/2007 | Marlowe .................... 455/345 |
| 2007/0086724 A1* | 4/2007 | Grady et al. ............... 386/46 |
| 2007/0101039 A1* | 5/2007 | Rutledge et al. ........... 710/303 |
| 2007/0124778 A1* | 5/2007 | Bennett et al. ............. 725/81 |
| 2007/0260798 A1* | 11/2007 | Griffin, Jr. ................. 710/303 |
| 2008/0188210 A1 | 8/2008 | Choi et al. |
| 2008/0304688 A1* | 12/2008 | Kumar ........................ 381/370 |
| 2009/0017881 A1 | 1/2009 | Madrigal |
| 2009/0061841 A1 | 3/2009 | Chaudhri et al. |
| 2009/0076892 A1* | 3/2009 | Rolf ............................ 705/14 |
| 2009/0113318 A1 | 4/2009 | Roseway et al. |
| 2009/0265103 A1 | 10/2009 | Kostepen |
| 2010/0250816 A1* | 9/2010 | Collopy et al. ............ 710/303 |
| 2010/0318709 A1* | 12/2010 | Bell et al. .................. 710/303 |

FOREIGN PATENT DOCUMENTS

| | | |
|---|---|---|
| JP | 2001-141501 | 5/2001 |
| KR | 10-2002-0082510 | 10/2002 |
| KR | 10-2009-0029518 | 3/2009 |
| KR | 10-2009-0093444 | 9/2009 |

OTHER PUBLICATIONS

Dilger, Daniel Eran. "Apple Insider: Using iPod & iPhone Video Out: Background and In-Depth Review." Dec. 20, 2007 [Retrieved on Oct. 27, 2010]. Retrieved from the Internet <URL: http://www.appleinsider.com/articles/07/12/20/using_ipodiphone_video_out_background_and_in_depth_review.html&page=2> 8 pages.

International Search Report & Written Opinion for Application No. PCT/US2010/054578, dated Mar. 28, 2011, 13 pages.

International Search Report & Written Opinion for Application No. PCT/US2010/052024, dated Jun. 10, 2001, 11 pages.

SmithGear: Home & Office Products. "Gigaset One Bluetooth Cell Phone—Home Phone Docking Station Device." [Retrieved on Oct. 27, 2010] Retrieved from the Internet <URL: http://www.smithgear.com/itc-bt.html> 4 pages.

Tezuka, Taro and Katsumi Tanaka. "Temporal and Spatial Attribute Extraction from Web Documents and Time-Specific Regional Web Search System." Web and Wireless Geographical Information Systems: 4th International Workshop, Nov. 2004, vol. 3428, pp. 14-25.

* cited by examiner

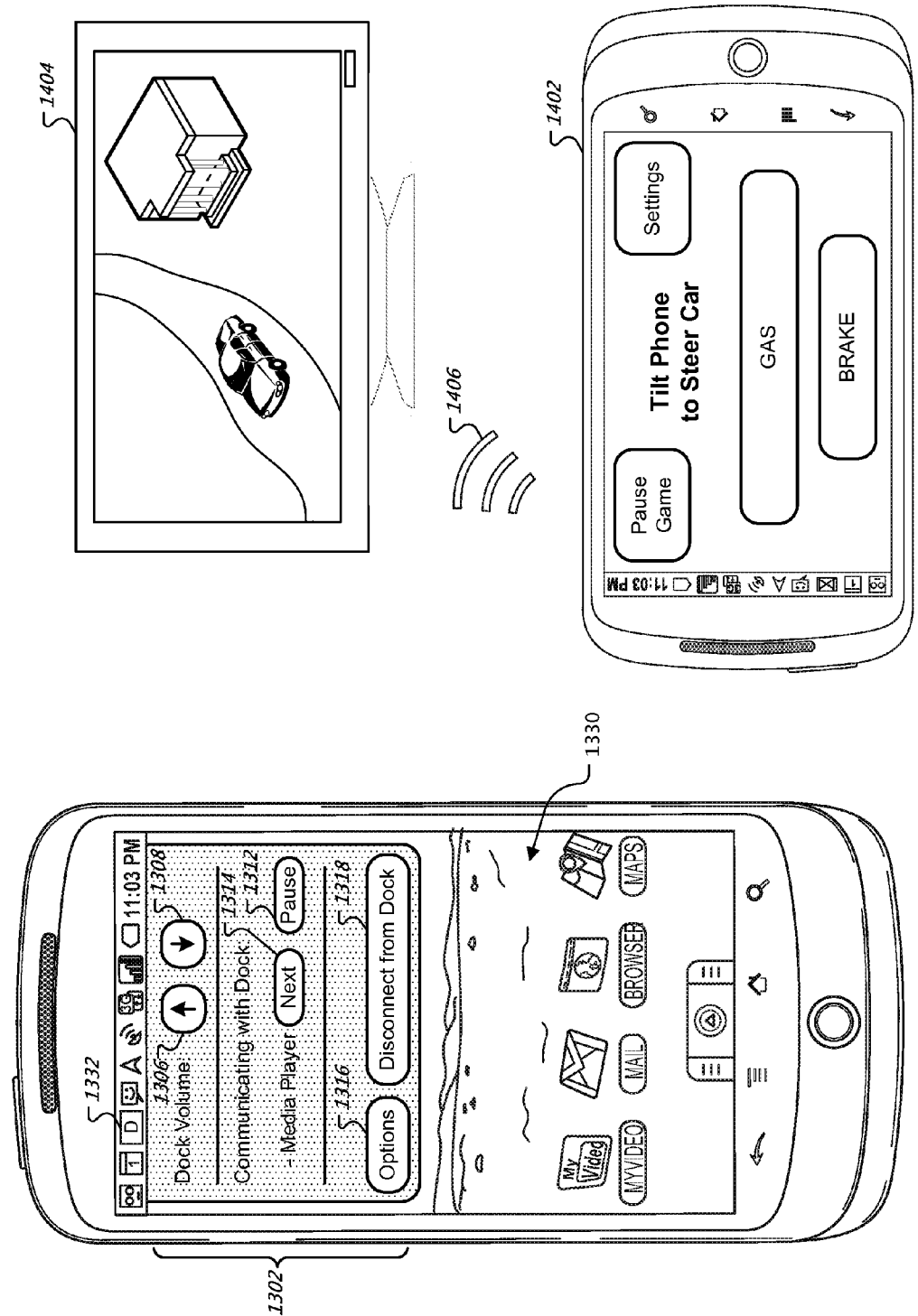

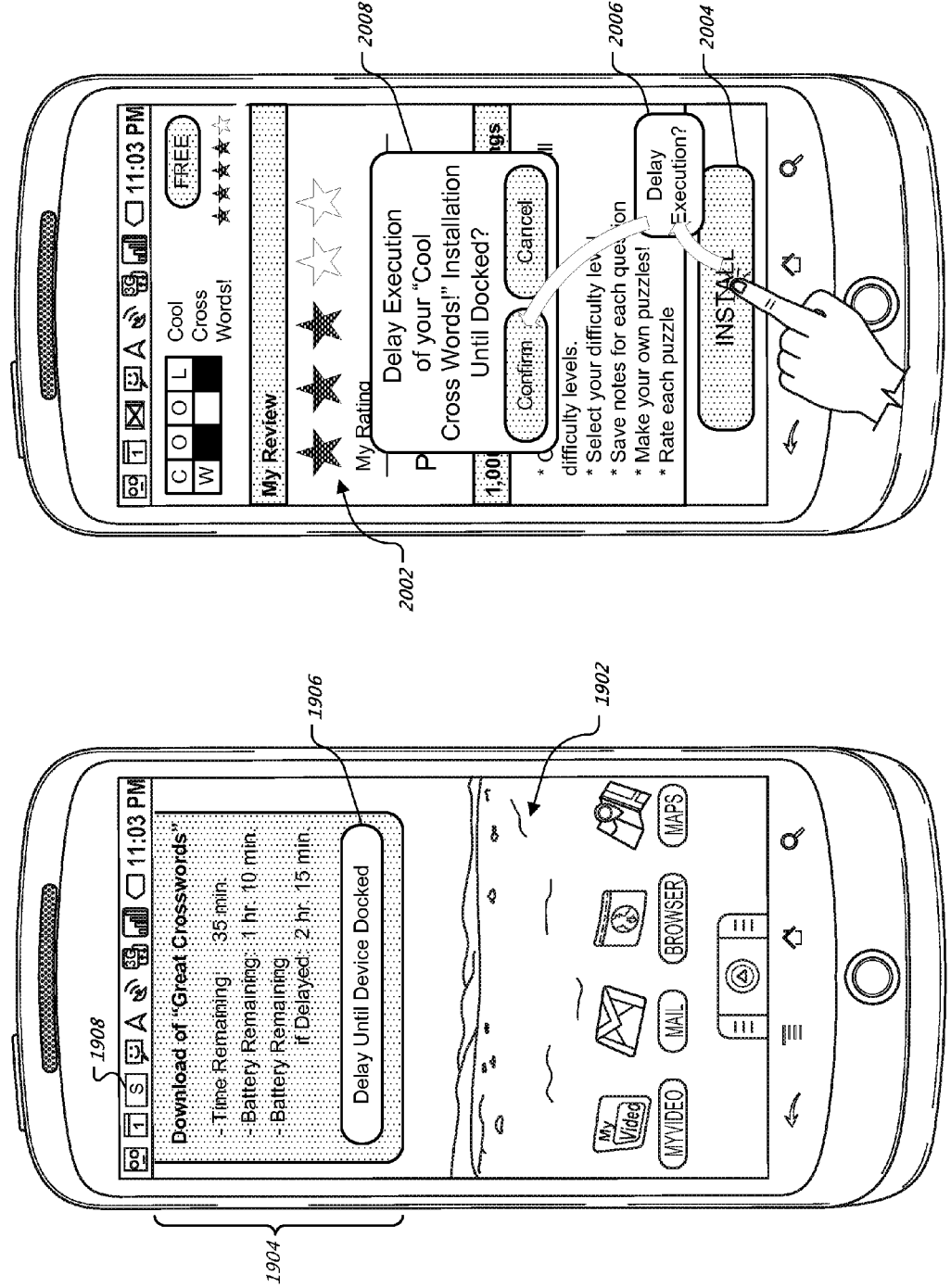

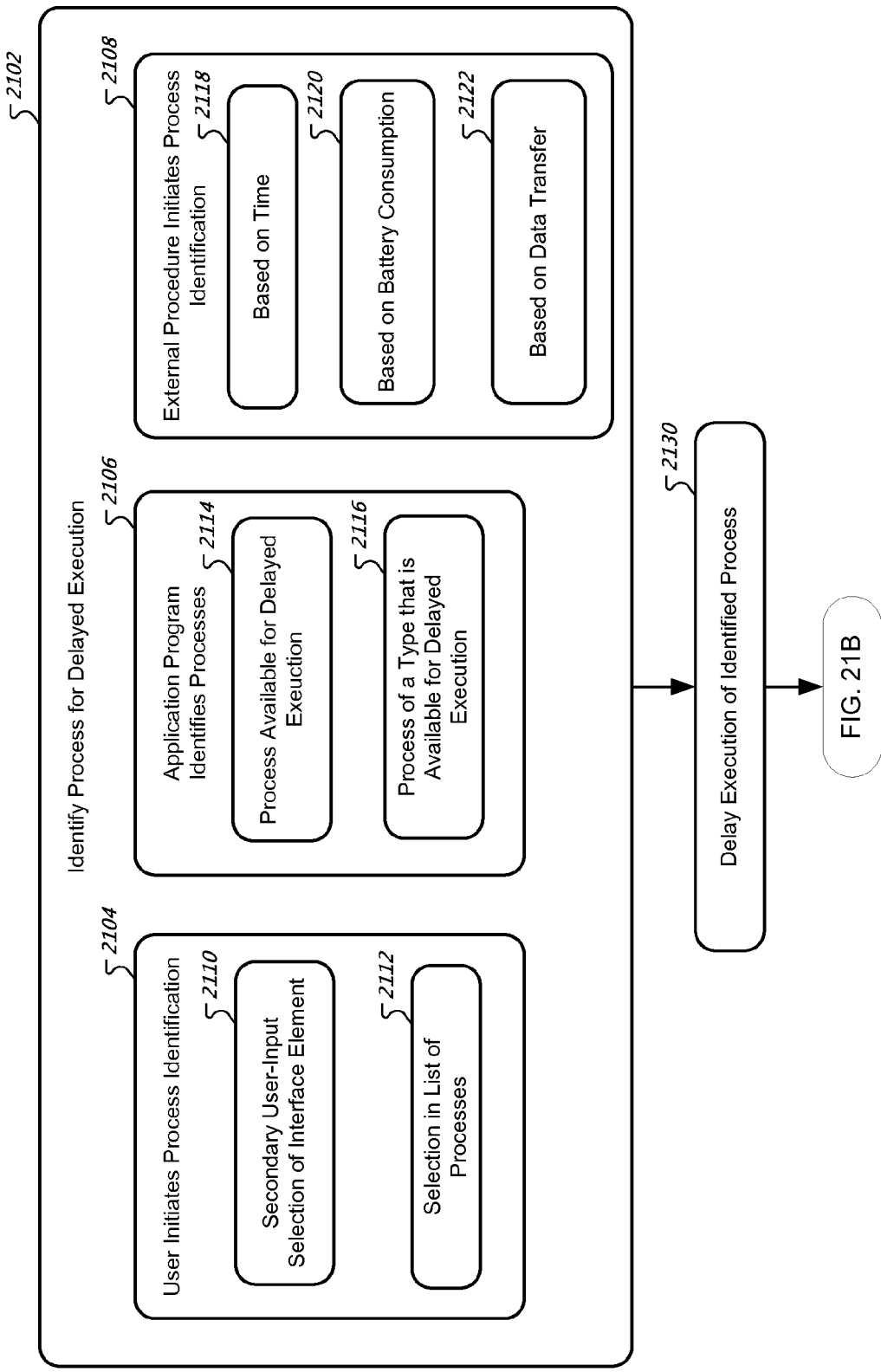

DOCK-SPECIFIC DISPLAY MODES

CROSS-REFERENCE TO RELATED APPLICATIONS

This application is a continuation of and claims priority under 35 U.S.C. §120 to U.S. application Ser. No. 12/914,313, filed on Oct. 28, 2010, which is a non-provisional of and claims priority to U.S. Provisional Application Ser. No. 61/255,847, filed on Oct. 28, 2009, the entire contents of which are hereby incorporated by reference.

TECHNICAL FIELD

This document generally relates to user interface displays.

BACKGROUND

Mobile computing devices such as smartphones may offer users rich experiences. Such a device may allow users to browse internet websites, download third-party application programs, use mapping applications that show the device's present geographical location on a map, and make telephone calls, among many possibilities.

Users can place such a mobile device in a dock to power a battery of the device or to supplement the functionality of the device. For example, a dock may include a male data terminal that engages a female data terminal of the mobile device. The dock may create a snug fit with the mobile device to ensure that the data terminals are not damaged upon user pivoting of the mobile device in any direction. Upon connection of the terminals, the dock can supply electrical power to the mobile device.

The mobile device may communicate data to the dock through the data terminal, for example, to play music or display a video. The dock may include components that are superior to components in the mobile device, for example, speakers or a display that are larger than those of the mobile device. The mobile device may receive commands from the dock, for example, in response to a user selecting a "next song" button on the dock.

Upon the mobile device being placed into the dock, the display of the mobile device may change. The display may remain substantially the same while the mobile device is connected to the dock, and may change back to an original display when the user removes the mobile device from the dock. Communication between the mobile device and the dock may be preconfigured and the device and dock may begin to communicate immediately upon user placement of the device in the dock, without user intervention.

A mobile computing device may include various mechanisms for reducing battery usage. For example, upon the device becoming low on stored power, the mobile device may switch to a low-power energy state. The switch to the low-power energy state may reduce a brightness of a display, reduce a frequency of mobile device wireless data transfers, and reduce an effective processing speed of the mobile device.

The mobile computing device may include an application program that allows a user to identify a location at which the user has parked his car, and the application program may store the location. Upon the user desiring to find the location of his car, the user can launch the application program. The launched application program can identify a direction to the user's car.

SUMMARY

This document describes techniques, methods, systems, and mechanisms for displaying a graphical interface. In general, a mobile computing device may be paired with a dock. Upon docking, the mobile device may determine a type of the dock, and may present a graphical user interface that is specific to the type of dock. For example, the mobile device may display a configuration interface the first time that the mobile device is paired with a particular type of dock. The configuration interface may allow the user to activate automated wireless communication between the mobile device and the dock, for example, to play mobile computing device audio over the dock speakers. The configuration interface may not be displayed upon subsequent dockings.

In general, one aspect of the subject matter described in this specification can be embodied in a computer-implemented method. The method includes determining that a mobile computing device has electrically coupled by physical contact with a docking system that is adapted to supply electrical power for charging the mobile computing device. The method includes determining that the docking system is a first type of docking system from a plurality of types of docking systems. The method includes selecting a first user interface profile that corresponds to the first type of docking system from among a plurality of user interface profiles, each of the plurality of user interface profiles corresponding to a respective type of docking system from the plurality of types of docking systems. The method includes presenting, by the mobile computing device for display, the first user interface profile in response to selecting the first user interface profile.

Another aspect of the subject matter described in this specification can be embodied in a computer-implemented method. The method can include determining that a mobile computing device has electrically coupled by physical contact with a docking system that is adapted to supply electrical power for charging the mobile computing device. The method can include determining that the docking system is a first type of docking system from a plurality of types of docking system. The method can include selecting a first configuration user interface that corresponds to the first type of docking system from among a plurality of configuration user interfaces, each of the plurality of configuration user interfaces corresponding to a respective type of docking system from the plurality of types of docking systems. The method can include determining that the mobile computing device has not electrically coupled with the docking system before. The method can include presenting, by the mobile computing device for display, the first configuration user interface. The method can include receiving user input, with the first configuration user interface, for activating wireless communication between the mobile computing device and the docking system. The method can include storing an indication that wireless communication is to be activated when the mobile computing device is electrically coupled with the docking system. The method can include determining that the mobile computing device has electrically coupled with the docking system a subsequent time. The method can include presenting, by the mobile computing device for display, a user interface that corresponds to the docking system without presenting the first configuration user interface. The method can include establishing wireless communication between the mobile computing device and the docking system based on the stored indication.

In yet another aspect, the subject matter described in this specification can be embodied in a computer-implemented system. The system includes a dock detector that is programmed to (i) determine that a mobile computing device has electrically coupled for charging with a docking system that is adapted to supply electrical power for to the mobile computing device, and (ii) determine that the docking system is a first type of docking system from a plurality of types of docking system. The system includes a repository of electronically stored user interface profiles that specify different schemes for presentations of information with the mobile computing device, each user interface profile corresponding to a type of docking system from the plurality of types of docking systems. The system includes a user interface selector that is programmed to select a first user interface profile from the repository of user interface profiles based on the selected user interface profile corresponding to the first type of docking system. The first user interface is selected for use by the mobile computing device in response to the dock detector determining that the mobile computing device has electrically coupled with the docking system and that the docking system is a first type of docking system.

Particular embodiments can be implemented, in certain instances, to realize one or more of the following advantages. A user may not need to provide user input for a computing device to enter dock-specific states. Instead, the user may only simply place the mobile device in a dock and the mobile device may enter a mode that is specific to the type of dock. The user may be prompted to configure mode settings a first time that the computing device is docked, without having to provide user input to navigate to a settings interface. Thus, a user may be made aware of the dock's capabilities upon docking, and may be more likely to use the dock for its full potential.

The details of one or more embodiments are set forth in the accompanying drawings and the description below. Other features, objects, and advantages will be apparent from the description and drawings, and from the claims.

DESCRIPTION OF DRAWINGS

FIG. 13 shows a user interface of a mobile computing device that has been removed from a dock, but that remains in wireless communication with the dock.

FIG. 14 shows another user interface of a mobile computing device that has been removed from a dock, but that remains in wireless communication with the dock.

FIG. 19 shows a user interface for delaying execution of a computer process.

FIG. 20 shows a user interface for delaying execution of a computer process.

FIGS. 21A-B show a flowchart of an example process for delaying execution of computer processes.

Like reference symbols in the various drawings indicate like elements.

DETAILED DESCRIPTION

This document generally describes mobile computing devices and associated docking systems.

General Overview

Base stations or docks are commonly used to recharge mobile computing devices, and in some instances can be used to also communicate to or from a device. For example, a simple power cord can be used to recharge a device, while a music base system may provide power and may also receive data through the same physical connection that supplies the power, or a nearby physical connection, usually along an edge of the mobile computing device in a manner that allows a screen of the device to be visible to a user of the device while it is docked. The docking connections may be friction fittings so that a device may be inserted and removed easily, though click locks may also be used to help ensure that a cord or other structure does not dislodge easily from the device.

Figure 1:
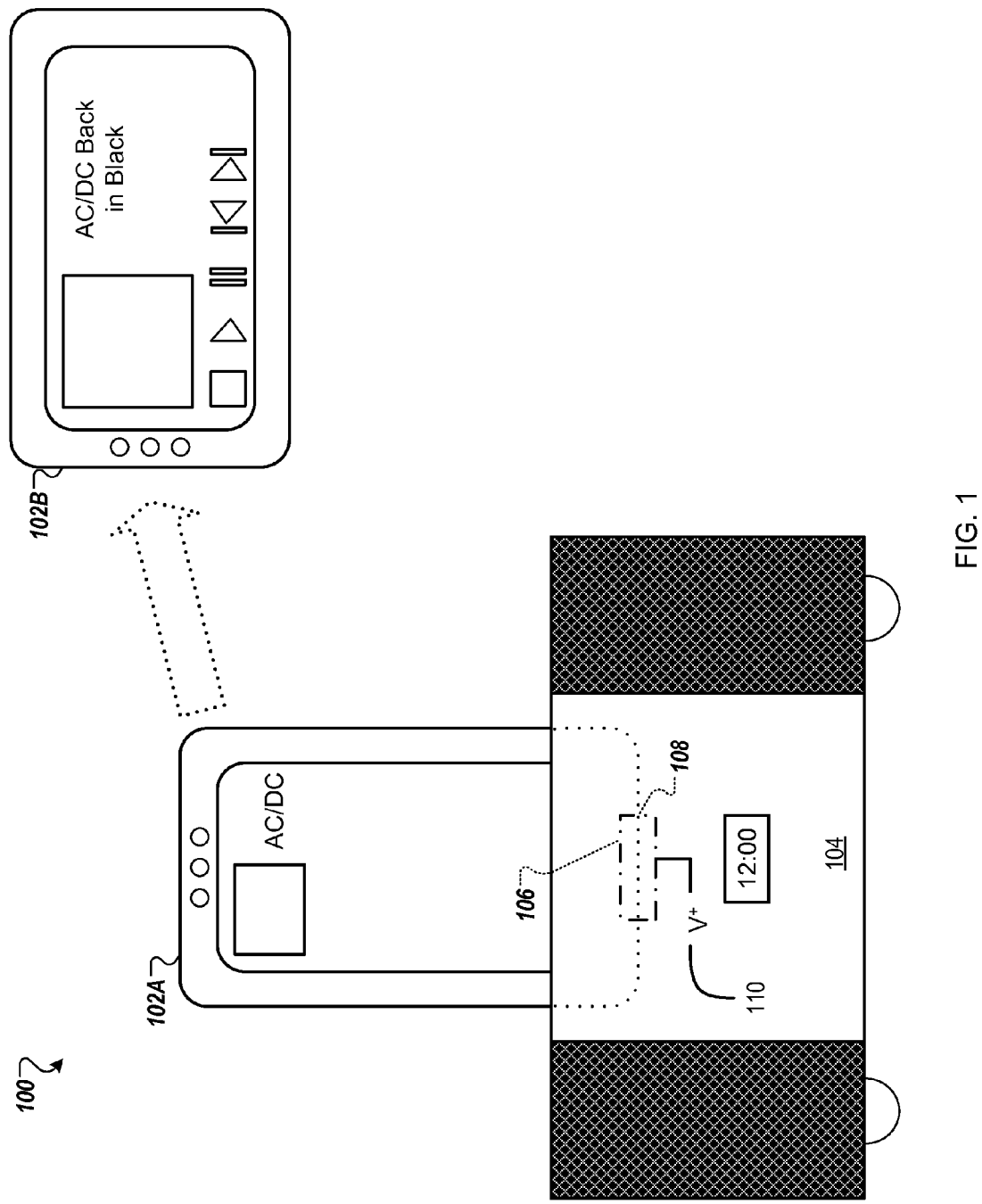
FIG. 1 shows a music docking system and a mobile computing device in the form of a touchscreen smartphone.

FIG. 1 shows a music docking system and a mobile computing device in the form of a touchscreen smartphone. This figure shows schematically a system in which a wired electrical connection is made upon docking the device, and the formation of the electrical connection triggers other actions on the device to occur. In the figure, the dock 104 takes a familiar form of an appliance that can be plugged into a standard electrical outlet and that includes amplifiers and speakers, among other things.

Figure 2:
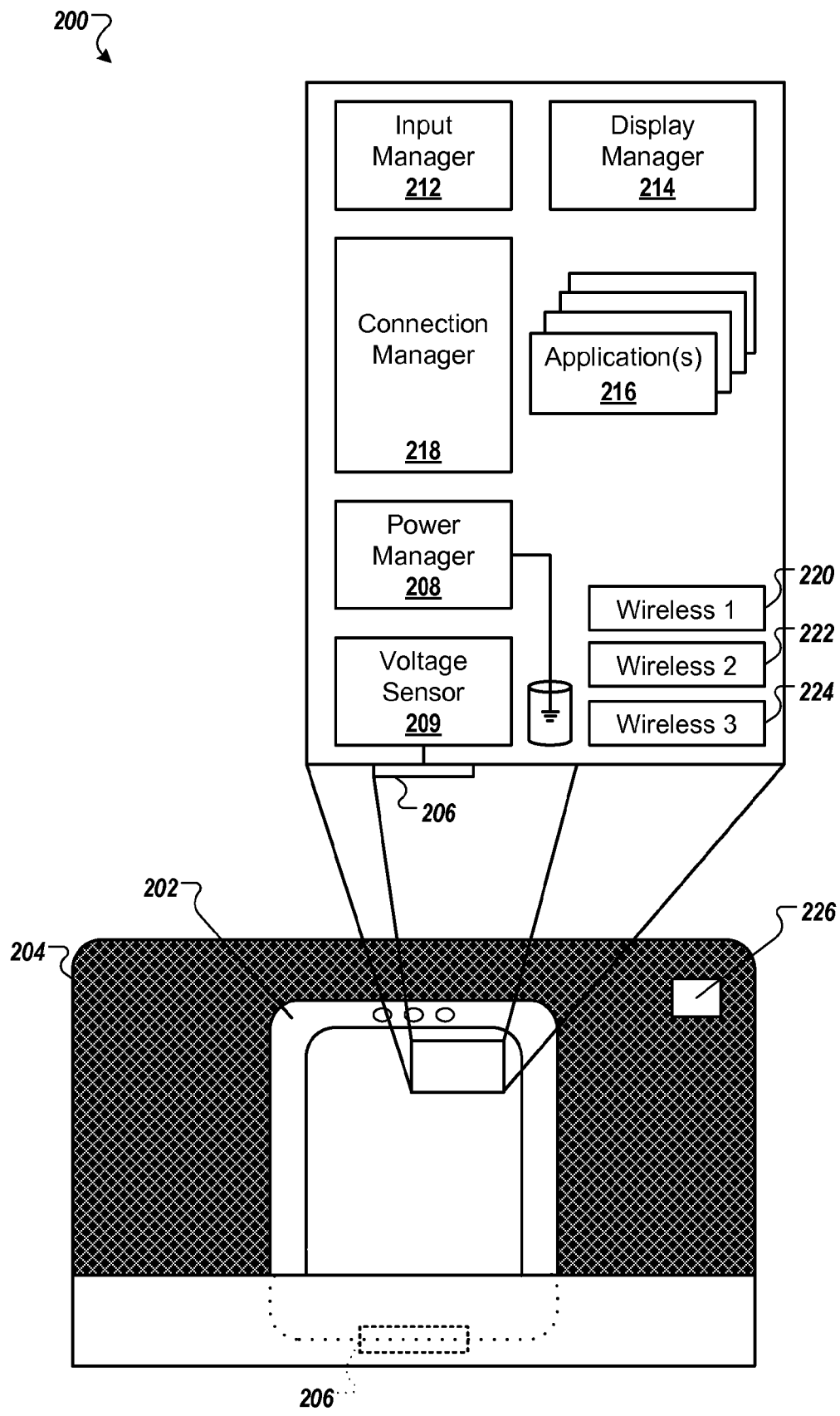
FIG. 2 shows a schematic diagram of a docked mobile computing device.

A first device state 102A of the mobile device is shown when the device is physically connected to the dock 104, and a second device state 102B is shown when the device has subsequently been undocked. A charging mechanism is shown schematically in the figure by supply voltage 110 that is provided through a physical docking connector 108 to recharge batteries in the device and to allow the device to operate when it is docked. The dock 104 also has a display that can show a time, or status relating to the dock 104, including via information that is received from the device FIG. 2 shows a schematic diagram of a docked mobile computing device. An input manager 212 in the device manages input to the device, including touch input to a screen on the device. A display manager 214 coordinates with the touch manager and controls what items are displayed in what positions, which will be shown over other items, and which will be shown as having the device's focus.

A connection manager 218 manages docked and wireless connections for the device, such as in the manners discussed above. For example, the connection manager 218 may infer a context for a device based on the manner in which it is docked, and may notify various applications 216 that may be run on a processor of the device 200, including navigational applications, of the device context. A power manager 208 and voltage sensor 209 cooperate to determine when a device has been plugged into a power source, and also to determine when certain activities may occur on a device after it has been plugged in. Finally, various wireless interfaces 220-224 may be employed by the device 200 in order to communicate by a variety of modes, such as BLUETOOTH, WiFi, 3 G, 4 G and other cellular connections.

Figure 3:
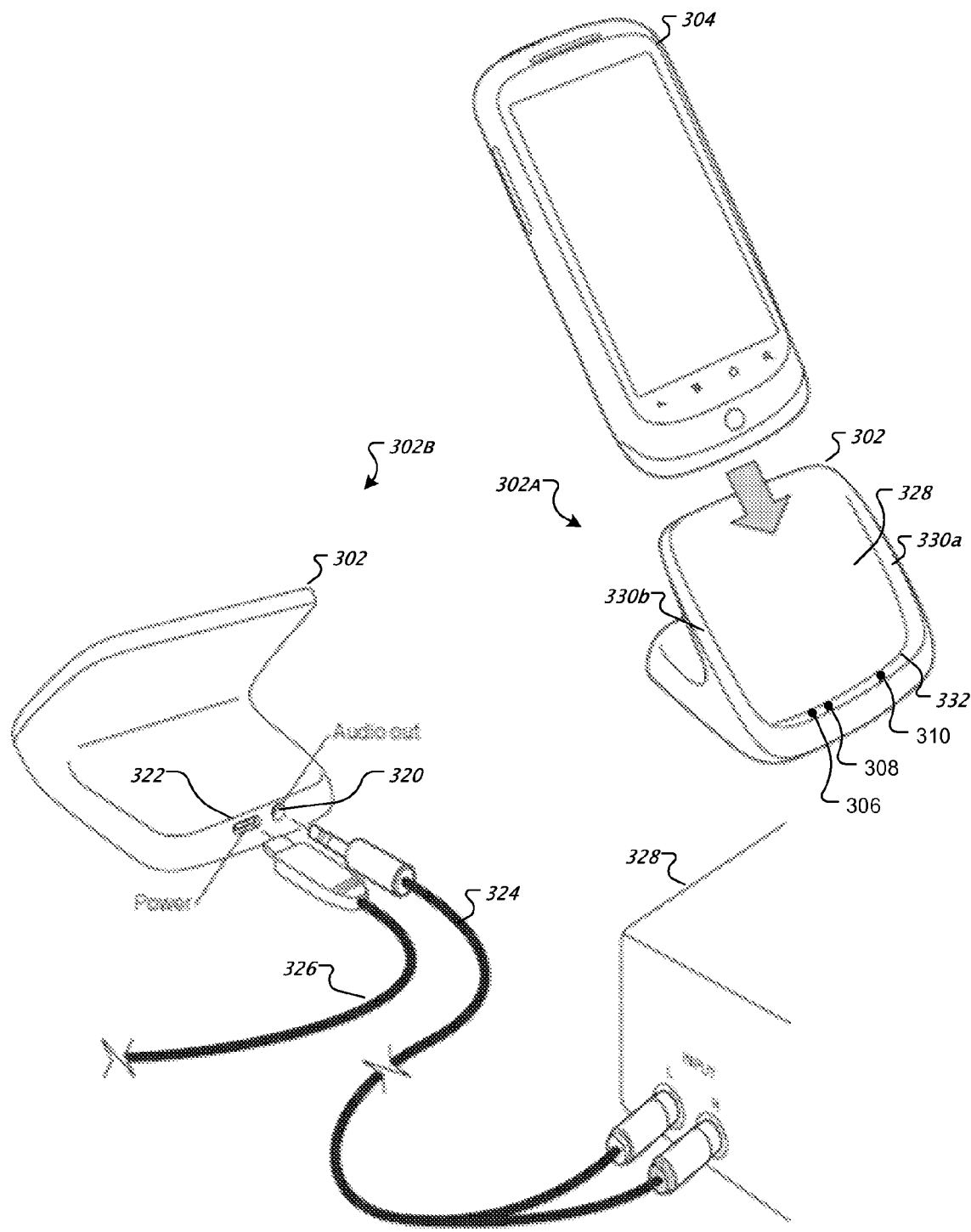
FIG. 3 shows an example desktop dock for a mobile computing device.

FIG. 3 shows an example desktop dock for a mobile computing device. This figure shows the desktop dock 302 in both a front view 302A and a rear view 302B. As illustrated in the front view 302A, the dock 302 is adapted to receive a mobile computing device 304 when the dock 302 is resting on a flat surface. In other words, a user of the device 304 may place the device 304 into the dock, for example, to charge a battery of the device 304 and route an audio signal to an external speaker system.

The dock 302 may include three conductive pins for establishing physical electrical connections with the device 304, when it is docked. A first pin 306 may provide a positive voltage electrical current to the device 304. A second pin 308 may provide a reference voltage (e.g., ground) to the device 304. A third pin 310 may be used for bi-directional serial data communication between the dock 302 and the device 304. Additional pins may be included in other implementations, such as to provide for parallel data communications with the device 304.

As illustrated in the back view 302B, the dock 302 includes a 3.5 mm female audio output jack 320, and a female USB jack 322. A 3.5 mm to RCA cable 324 may connect the dock 302 to an external audio source 328 (e.g., a receiver of a home stereo system). A USB cable 326 may connect the dock 302 to a power brick for connection to an AC power source. In some examples, the USB cable 326 may connect to a DC power source without a power brick, for example by connecting to a laptop computer. The laptop computer may supply solely DC power to the dock 302, or may additionally establish digital data communications with the dock 302.

Accordingly, and as described in more detail throughout this document, the dock 302 may power a device 304 that has been placed in the dock 302, and may recharge a battery of the device 304. While docked, the device 304 may provide audio transmissions to the dock 302, which the dock 302 may route such transmission to the external audio source 328. The audio transmissions may be transmitted wirelessly between a radio transceiver in the device 304 and a radio transceiver in the dock 302. The pin 310 that is used for serial communication may be used to initiate the wireless communication, but not be used to execute subsequent data communication between the dock 302 and the device 304 (e.g., to subsequently transfer data that represents an audio signal).

Figure 4:
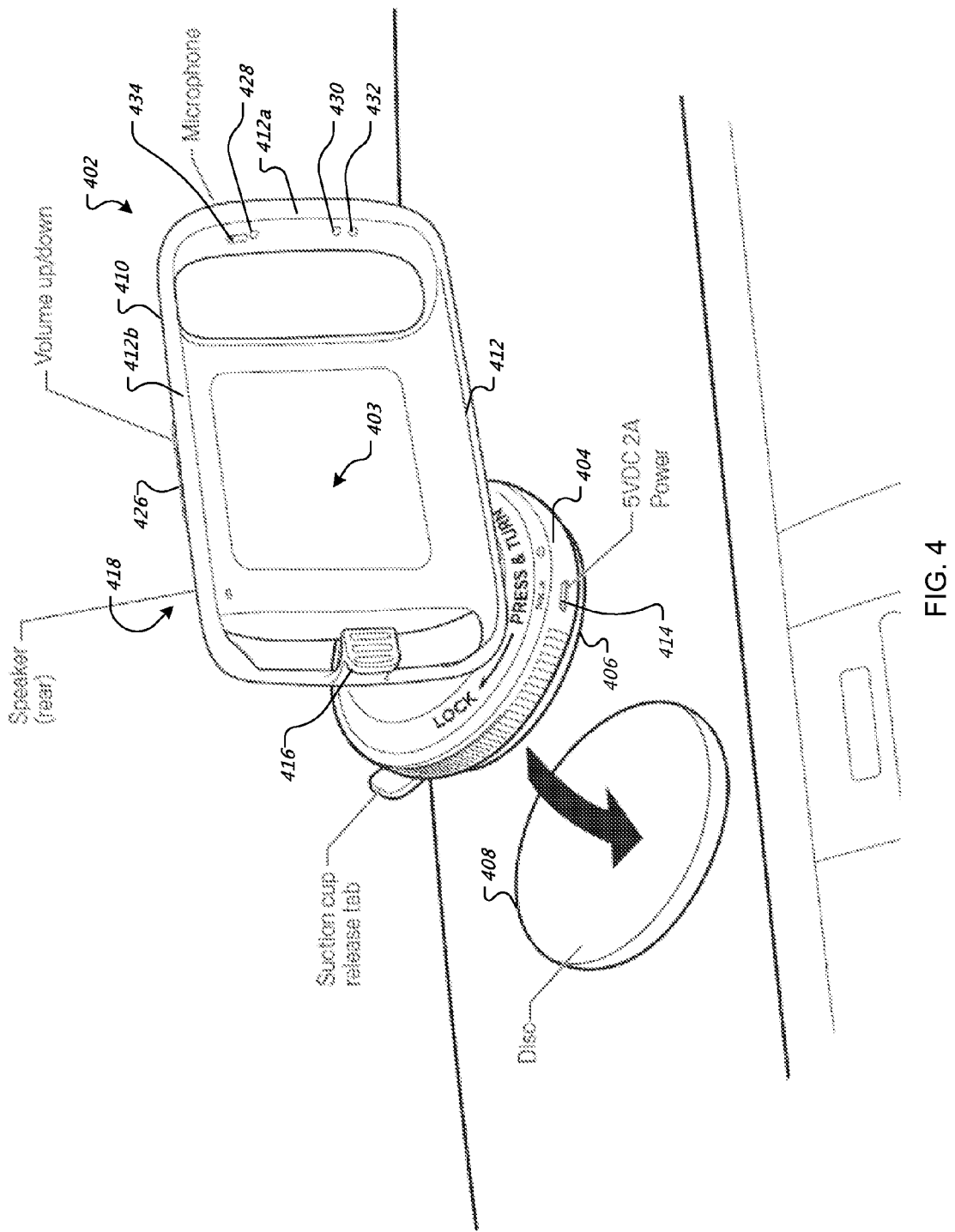
FIG. 4 shows an example car dock for a mobile computing device.

FIG. 4 shows an example car dock for a mobile computing device. In this figure, the car dock 402 includes a base 404 for mounting the car dock 402 to a surface (e.g., a car dashboard, a car windshield, a desk, or a wall). The base 404 may include a suction cup 406 that enables the base 404 to mount to consistent surfaces. A disk 408 can be adhesively attached to an uneven surface (e.g., a rippled car dashboard) to provide a consistent surface for the dock.

The base 404 may connect to the docking body 410 via a rod. A first end of the rod may connect with the base 404 using a ball joint, while a second end of the rod may connect to the docking body 410 with another ball joint. Thus, the docking body 410 may be pivoted to face in different orientations, and may rotate between landscape and portrait orientations.

The docking body 410 includes a recessed inner portion 403 that is surrounded by a wall 412. The recessed inner portion 403 and the wall 412 are shaped to correspond to the outside of a housing of a mobile computing device. A lower wall 412a and a retractable top latch 416 may at least partially enclose a front surface of the mobile device in order to constrain the mobile device to the dock 402. In some examples, the side walls 412b may not partially enclose the front surface. In other words, the walls may not circumferentially wrap more than half-way around a narrowest portion of the mobile device.

The car dock 402 may include a female USB jack 414 to receive a USB cord (not shown) that supplies power, and in some examples, data. The car dock 402 also includes speakers 418 that radiate sound from a back side of the dock. In some examples, the speakers 418 play audio that has been wirelessly transmitted from a mobile device to the dock. A volume rocker switch 426 allows a user to adjust the volume of audio that is output by the speakers 418. The car dock 402 also includes a microphone 434. The dock microphone 434 may have acoustic qualities that are better suited for speakerphone operation than does a microphone of a mobile device. Thus, the dock 402 may wirelessly transmit, to a docked device, an audio signal that is received using the dock microphone 434.

A first pin 432 may provide a positive voltage electrical signal to a docked device. A second pin 430 may provide a reference voltage to the device. A third pin 428 may be used for serial data communication between the device and the dock 402. The pins 428-432 may be provided in a same spacing and orientation as the pins 306-310 of FIG. 3. In other words, the pins in both devices contact the same portions of a mobile computing device that is moved between the docks.

Figure 5:
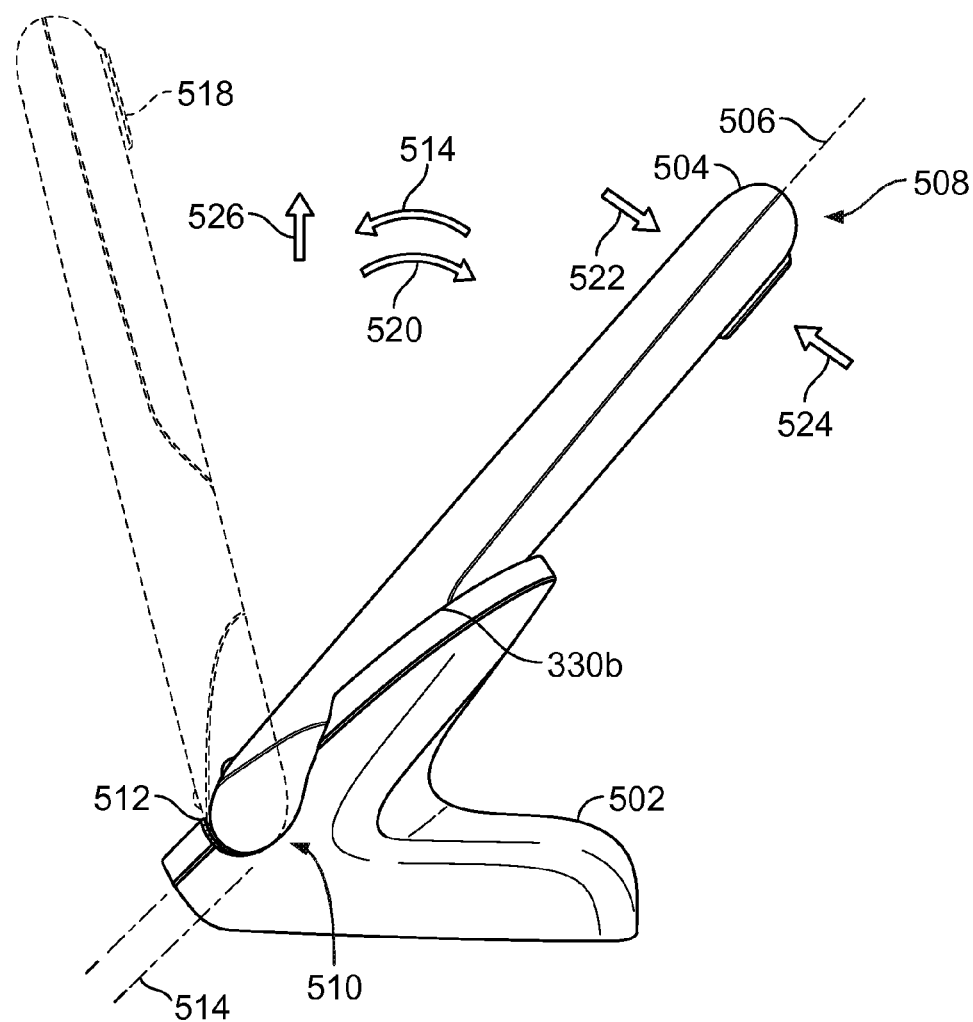
FIG. 5 shows a partially transparent view of a dock in which a mobile computing device has been placed.

FIG. 5 shows a partially transparent view of a dock in which a mobile computing device has been placed. The dock 502 may be the desktop dock 302 that is illustrated in FIG. 3. The dock 502 is shown as partially transparent to illustrate its engagement with the mobile computing device 504.

The mobile computing device 504 may be docked into the dock 502. A docked device 504 may be a device that has been placed by a user into a recess of the dock 502 that is shaped to correspond to at least a portion of an outside of a housing for the device 504. In some examples, the device's conductive pads 602, 604, and 606 (see FIG. 6) electrically contact the dock's conductive pins 306, 308, and 310 (see FIG. 3) when the device 504 is docked. When docked, the conductive elements in each dock may remain in contact without continued user assistance. Each conductive pad may be electrically isolated from each other, and each conductive pin may be electrically isolated from each other.

In some examples, the conductive pins 306, 308, and 310 are pins that are biased by springs towards the recess in the dock. When the device 504 has been docked, the conductive pads 602, 604, and 606 engage the pins 306, 308, and 310.

The pins may be rods that are substantially cylindrical along a length of the pins and that are rounded at the end of the pin that contacts the respective conductive pads 602, 604, and 606. When docked, the device 504 may force the pins at least partially out of the cavity and into an internal portion of the dock 502.

In some implementations, the dock 502 is designed to receive the device 504 in a "frictionless" manner. In other words, a user may place and remove the device 504 from the dock 502 without applying much more force than is necessary to manipulate the device 504 in free space.

Accordingly, the dock 502 may not include any guiderails or protrusions that engage with the device 504 and that cause the device 504 to be placed into the dock 502, or removed from the dock 502, with a one-dimensional linear movement. For example, a proximal end 510 of the mobile device (e.g., an end that is closest to the dock 504 along a longitudinal axis 506 of the mobile device) may be placed into a lower portion of the recess as the mobile device is being docked, so that the longitudinal axis 506 of the mobile device remains substantially parallel to a longitudinal axis 514 of a rear face 328 of the dock.

In another example, the proximal end 510 of the mobile device 504 may be positioned in a lower portion of the cavity so that a longitudinal axis 506 of the mobile device 504 is not substantially parallel with the longitudinal axis 514 of the rear face 328 of the dock 502 (e.g., as in the position 518). In this example, the distal end 508 of the mobile device 504 may be pivoted (e.g., as illustrated with arrow 520) in order to place the mobile device 504 in a resting dock position. Upon pivoting, the longitudinal axis 506 of the mobile device 504 may be moved into a substantially parallel relationship to the longitudinal axis 514 of the face 328 of the dock 502.

Thus, the device 504 may be initially placed into the dock 502 in an orientation that causes compression of the pins 306, 308, and 310 in an orientation such that the direction of pin compression is not parallel to the longitudinal axis 506 of the device. Upon pivoting the mobile device, the direction of pin compression may align in a parallel relationship with the longitudinal axis 506 of the device. In some examples, no part of the dock 502 rotates with the device 504 as the device 504 is rotated into or out of a resting docked position.

The dock 502 may include a rear race 328, side walls 330a and 330b, and a lower retaining wall 332. The side walls 330a-b may cover a portion of the side walls 516 of the mobile device 504. The lower retaining wall 332 may include a lip 512 that does not substantially cover a front portion of the mobile device 504, and which may not cover any user input or user output devices on the mobile device 504. The lip 512 may rise enough to retain the device 504 in the dock 502 when the device has been docked.

The lip 512 may not, however, prevent the proximal end 510 of the mobile device from essentially popping out of the dock when a user applies force to the distal end of the mobile device 504 in a direction 522 that is oriented towards the rear face 328 of the dock. The force may cause the proximal end 510 of the mobile device to "jump" out of the dock 502, and may cause disruption of electrical communication between the pins 306, 308, and 310 and the conductive pads 602, 604, and 606. Removal of a device may be "prevented" when a force that is sufficient to lift the device 504 is applied to the device, and the device 504 is not removed from the dock 502.

Further, the lip 512 may not prevent the mobile device 504 from rotating in a forward direction 514 if a user applies a force 524 to the distal end 508 of the mobile device 504 in a direction that is away from a face of the 328 of the dock 502. Application of such force may cause the device 504 to pivot in the forward direction 514, eventually falling out of the dock if the user does not lift the device away from the dock after some degree of pivoting (e.g., 10 degrees). A user may also remove the device 504 so that a longitudinal axis 506 of the device 504 remains parallel to a longitudinal axis 514 of the face 328 (e.g., so that a rear face of the device 504 slides along the face 328 of the dock for two centimeters before removal away from the dock 502).

In some examples, a user lifts the device 504 in a vertical direction 526 out of the dock 502. In such examples, the device 504 may be removed from the dock with little apparent friction. For example, the dock 502 may not frictionally engage the device 504 as the device is removed, beyond frictional contact forces that may be present when a device is vertically removed from a surface (e.g., frictional forces that may be apparent when a device is vertically removed from a flat table). In some examples, these forces do not exceed 0.009625 Newtons.

In some examples, the device 504 may be removed from the dock 502 without substantial movement of the dock 502 occurring as a result of moving the device 504. For example, when the dock 502 is not affixed to the surface or held by a user, the dock may move less than 0.2 mm when the device 504 is lifted. Such lack of substantial movement may occur even when the dock 502 weighs less than the device 504, for example, seventy percent of the weight of the device 504 when the device 504 includes a battery.

The dock 502 may include three electrical pins 306, 308, and 310 that contact the device 504, and the device 504 may include corresponding electrical pads 602, 604, and 606. The electrical pads 602, 604, and 606 may each include a surface that is substantially flush with a surface of the exterior of a housing of the mobile device 504. For example, a substantially flush surface may sit no more than 0.5 mm above or below an outermost adjacent exterior surface of the device 504.

The mobile device 504 may include a female data connection terminal 610 on a bottom of the device 504. The dock 502, however, may not include a corresponding male data connection terminal. Thus, the mobile device 504 may include a data terminal that is oriented for exchange of data with the dock 502, while the dock 502 may not include a corresponding terminal.

The dock 502, accordingly, may not include components that engage, on the device 504, a surface of the device 504 that is internal to the device and that is parallel to the longitudinal axis 506. For example, if the dock 502 included a male data connection terminal that mated with the female data connection terminal 610, side walls of the male connection terminal may frictionally engage with the side walls of the female connection terminal 610. In contrast, pin 306, for example, contacts the conductive pin 602 in an orthogonal manner. Thus, the pins 306, 308, and 310 and the conductive pads 602, 604, and 606 may not prevent the mobile device 504 from laterally moving in a direction that is orthogonal to the dock's longitudinal axis 506 or the axis 328 of the dock (even if another portion of the dock may prevent such lateral movement). Instead, a proximal portion 510 of the mobile device may be able to move in a direction that is orthogonal to a direction of compression of the pins 306, 308, and 310, while the mobile device 506 is in contact with the pins 306, 308, and 310. A frictional force of a pin sliding across a face of a conductive pad is not a substantial frictional force.

Dock Identification and Establishing a Wireless Connection

Figure 7:
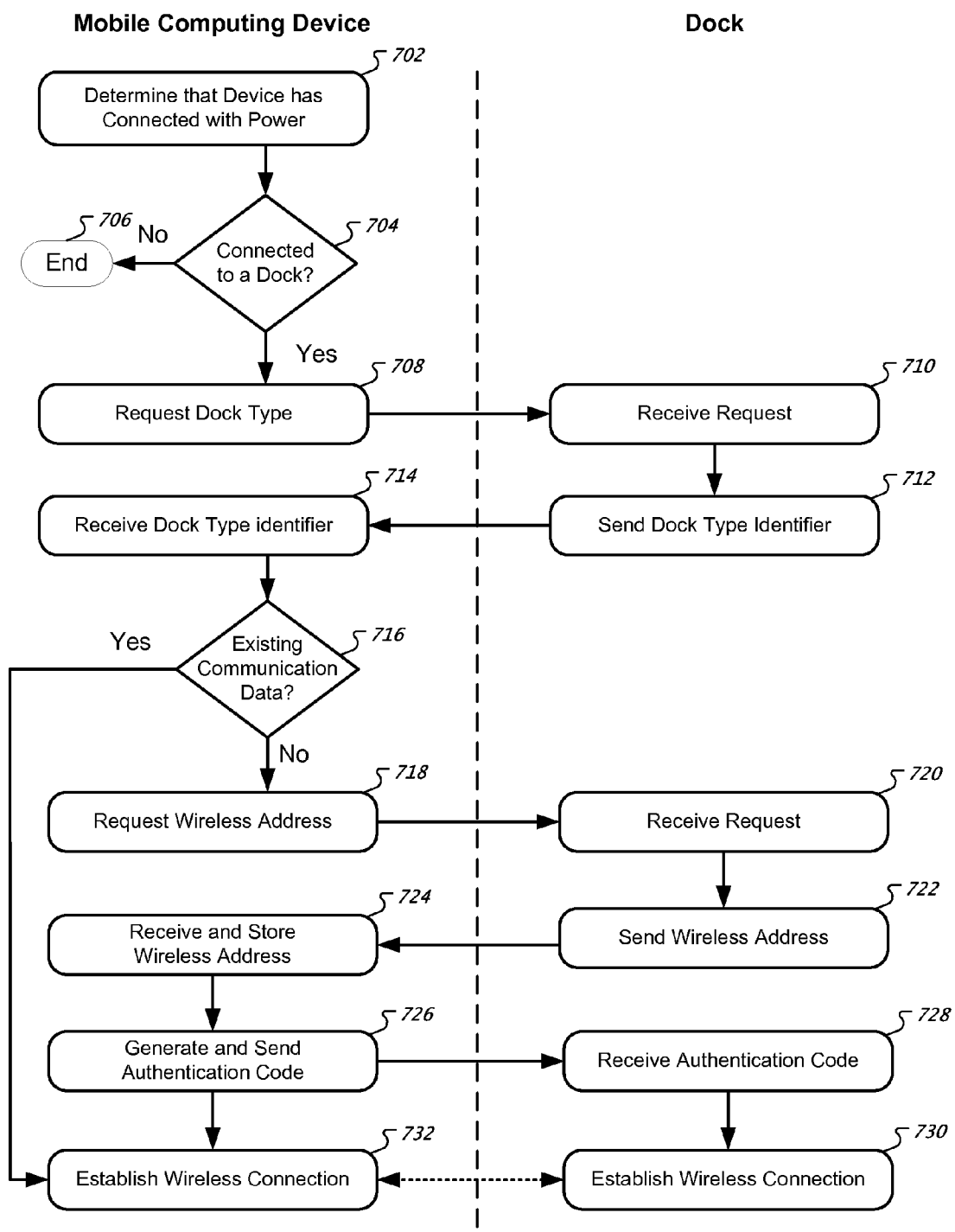
FIG. 7 shows a flowchart of an example process for identifying a dock that a mobile computing device has physically mated with, and for establishing a wireless connection with the dock.

FIG. 7 shows a flowchart of an example process for identifying a dock that a mobile computing device has physically mated with, and for establishing a wireless connection with the dock. The described actions may occur upon a user physically placing the mobile device into a dock, for example, as illustrated in FIG. 3 (i.e., the placement of device 304 into dock 302) and FIG. 4 (i.e., the placement of device 304 into dock 402). In various examples, the process describes an automatic BLUETOOTH pairing that occurs upon the mobile device determining the type of dock when upon docking.

Figure 6:
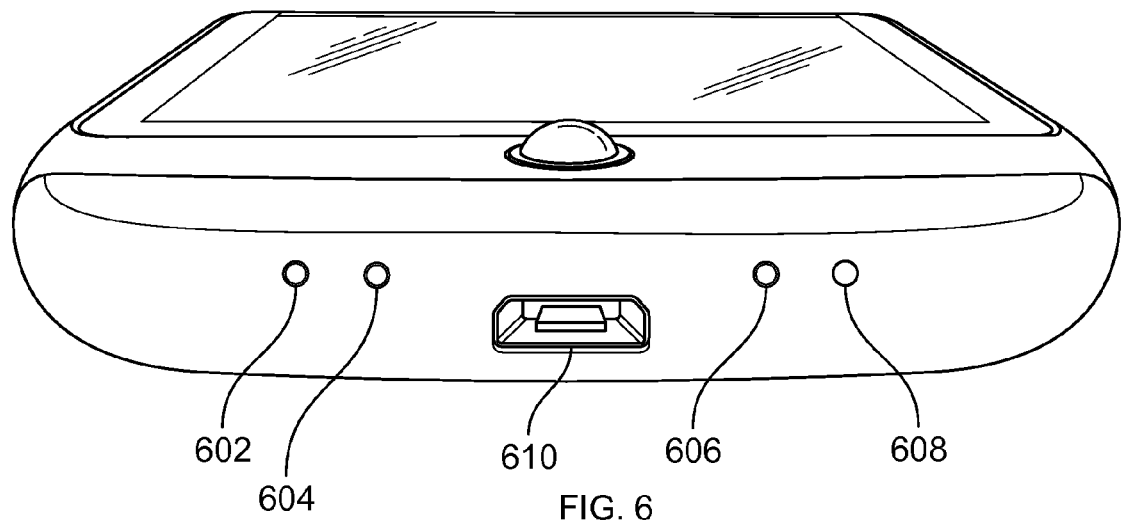
FIG. 6 shows a bottom view of a mobile computing device.

In box 702, the mobile computing device determines that the device has connected with electrical power. For example, the device may receive an indication that the device has begun to charge, or may receive an indication that voltage is present on an electrical bus that provides power for charging the device. As an illustration, the mobile computing device that is illustrated in FIG. 6 may determine that the device has been connected to electrical power when power is received at conductive pad 602.

In box 704, the mobile computing device determines whether the device is connected with a dock. For example, the mobile computing device may determine whether a voltage of the conductive pad 606, which may normally be pulled up to a first voltage level when the mobile device is not connected to a dock, has been pulled down to a second voltage level as may occur when the conductive pad 606 is electrically connected with pin 310.

The mobile computing device may perform the operations of boxes 702 and 704 separately because the mobile device may be unable to determine a source of the power (e.g., whether the power is being received through the data terminal 610 or through the conductive pad 602). In various examples, the determinations of boxes 702 and 704 are performed in a single step. In other words, the mobile device may be able to determine, when power is connected, whether the source of the power is through the data terminal 610 or is through the conductive pad 602. If the mobile device is not determined to be connected to a dock, the process ends (box 706).

In box 708, the mobile computing device transmits to the dock a command that requests that the dock respond with the dock type. In some examples, the command is transmitted over a single wire interface, for example, from the conductive pad 606 of the mobile device to the pin 310 of the dock.

In box 710, the dock receives the request. In response, the dock may access a stored alphanumeric identifier which identifies the dock type, and may transmit the dock type alphanumeric identifier back to the mobile device (box 712). In various examples, dock 302 and dock 402 would each respond with a different identifier, but multiple of the same type of dock may respond with the same identifier.

In box 714, the mobile computing device receives the dock type identifier. The device, at box 716, uses the identifier to determine whether the device has previously stored data for establishing a wireless connection with the dock (e.g., whether the device includes a wireless network identifier for the dock and an authentication code for establishing the wireless connection). If the device has the stored data, the device may establish the wireless connection, as described with reference to box 732. If the device does not have the stored data, the device requests the wireless network identifier from the dock (box 718).

In box 720, the dock receives the request for the wireless network identifier. In response, the dock may access a stored alphanumeric identifier of a network address that the dock may use for wireless communication, and may transmit the accessed network address back to the dock as the network identifier (box 722). In some examples, the network identifier is stored under the BD_ADDR variable and is a unique address of the dock as a BLUETOOTH device, similar to MAC addresses of a network card. This address may be used in pairing the mobile device and the dock.

In box 724, the mobile computing device receives and stores the network identifier. The mobile device may store the network identifier in association with the dock type identifier, so that the mobile device may identify the network identifier upon subsequently docking with the dock (and thus receiving the dock type identifier).

In box 726, the mobile computing device generates and sends an authentication code to the dock. For example, a BLUETOOTH device may use a passkey or pin code in order to establish communication with another BLUETOOTH device. Thus, the mobile device may generate the authentication code, send the code to the other device, and may store the code in association with the dock type identifier. The dock subsequently receives the code (box 728).

Upon the mobile computing device and the dock both having stored the code, the devices may establish wireless communication with each other. For example, with BLUETOOTH communication, the dock may send the passkey back to the mobile device as an acknowledgment, and in response both device may wirelessly pair and exchange data. In various examples, the dock may be configured to remain unable to wirelessly pair with any devices until the dock has received a code from another device over a physical electrical connection. In various examples, the dock wireless radio may remain off until the dock receives the wireless code.

In various examples, the dock generates the authentication code and transmits the code to the mobile device. In various examples, the dock requests the wireless address from the mobile computing device. In various examples, the communication between the mobile computing device and the dock is performed using Modified Frequency Modulation (MFM) and Run length limited (RLL) coding to ensure that the length of repeated bits during which a signal does not change is limited. In various examples, the mobile computing device and the dock establish wireless communication through a third device, for example, a Wi-Fi router.

In various examples, a transmission by either the mobile device or the dock starts with two "1" databits (0101 after MFM encoding, where "1" indicates a transition and "0" indicates a maintained output). Such a start allows the receiving device to synchronize on rising and falling edges, which may help avoid problems that are caused by a DC bias on the line, or problems that may be caused by a non-center switching threshold on the general purpose input/output.

In various examples, a device that is receiving data waits for an edge and measures the time from the last edge of the same polarity. An error is recorded if the edge occurs outside of a specified margin of error. Once the expected quantity of bits has been read, a validation may be performed to determine whether the received data represents a valid MFM encoded pattern.

In various examples, a device that is transmitting reads a hardware timer before and after toggling the output to generate an edge. If the difference in times is outside of an acceptable margin, the device stops transmitting. If there has been a delay in the code, the receiving device may detect that there was an error unless the error occurred during the last one or more bits of a byte or of a transmission sequence. Errors in the last bit may be caught by a checksum byte as an erroneous transmission may not be a valid MFM sequence. A known stop bit may be added to improve the error checking.

In various examples, all write commands are the same length and all read commands are the same length. Both read and write commands may begin with the mobile device sending the command followed by a short delay where the dock takes control of the data line by driving the data line to the same voltage level that the mobile device left the line in. The dock may immediately respond with a response. The response may include two start data bits followed by one acknowledgment data bit for a write command (e.g., box 726). The response may include two start data bits followed by 8 result data bits for read commands (e.g., boxes 708 and 718). In some examples, the dock cannot initiate a command, and may only respond to commands by the mobile device.

In various examples, a separate command may be used to send or receive each byte of multi-byte data such as the wireless network identifier or authentication code. Another command may read or send a checksum byte. Breaking the communication into smaller portions may limit the time spent with device interrupts disabled.

In various additional examples, identification of a dock type may occur in a variety of manners. For example, one or more electrical contacts may be provided on the device and at a corresponding location on the dock. The number of electrical contacts that are made between the device and the dock may be used to determine what type of dock the device has been docked to. For example, where the device and dock each have two contacts, the device could determine three different dock types, in which a first contact is made, a second contact is made, or both contacts are made (no contacts may have to be assumed to represent a device that is not built to the standard). The three types of docks in such an example may include a music player, an automobile, and a video monitor. Additional electrical contacts may provide for additional information to be determined by the mobile computing device when it is docked. The particular types and locations of contacts may be defined by a standard, so that the mobile device may be interoperable with docks made by a variety of suppliers. In a similar manner, magnets may be placed in the device and/or dock, and attraction of the magnets to items placed in the opposite machine may be used to make determinations in a manner similar to that for the contacts just discussed.

In another implementation, the dock identification may be communicated to the mobile computing device through a physical data connection between the dock and the device. For example, the data connection may be parallel to or integral with the electrical connection between the device and the dock, or the data may be superimposed over the electrical signal that is passed to the device. A digital representation may be provided to the device in this manner that identifies the type of dock, and thus the context in which the mobile device has been docked.

The context in which the device has been docked may also be inferred from a variety of other signals. For example, an accelerometer on the device may determine that the dock is vibrating at a particular frequency that is indicative of an operating automobile, and the device may thus infer that the dock is an automobile dock. In other situations, the device may emit a tone and listen for the tone, and determine its environment based on the manner in which the tone has been modified from its admitted state.

For example, particular dampening of the tone or echoing of the tone may indicate that the device is in a user's home, car, or the outdoors. In a similar manner, docking in a car may enable the device to sync over a BLUETOOTH connection with the car itself, and the device may use the fact of the connection, or data that is passed over the connection, to determine that it has been docked within a car. A more granular determination may be made in other circumstances such as where a device may determine which car of multiple cars it has been synced in or docked in. For example, the device may determine that it has been docked in a sports car and may adjust its mode of operation accordingly, versus being docked in a sport utility vehicle. A user may also establish profiles for each type of vehicle so that the docked device changes to the particular profile when it senses that it has been docked into that type of vehicle.

Dock-Specific Profiles

Figure 8:
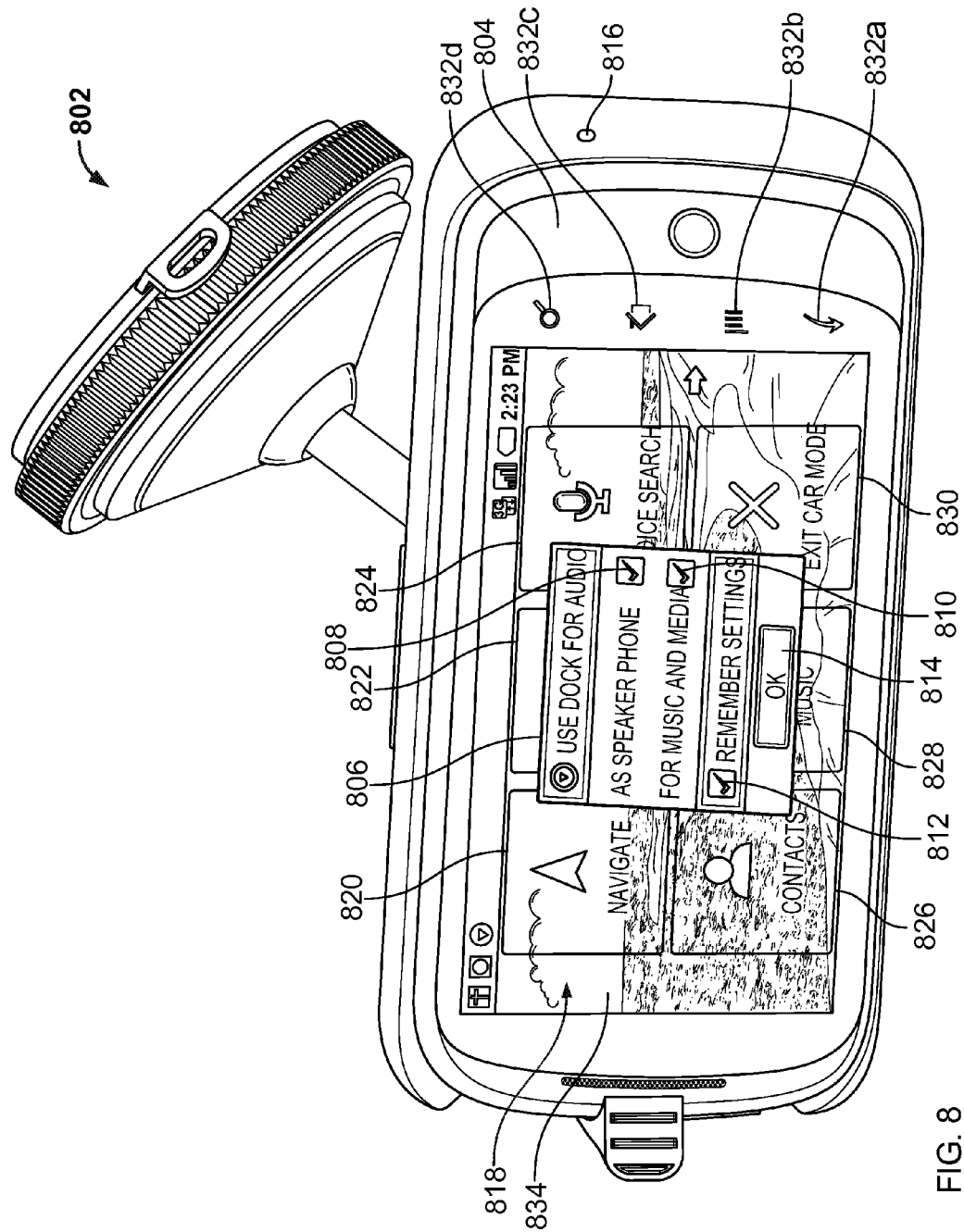
FIG. 8 shows an example user interface profile that is displayed by a mobile computing device upon docking in a car dock.

FIG. 8 shows an example user interface profile that is displayed by a mobile computing device upon docking in a car dock. As an illustration, a user of a mobile computing device 804, Jim, is sitting in his house and using his mobile device 804 to view a newspaper website. Jim receives a call from a friend asking if Jim would like to join the friend for supper. Jim agrees, walks out to his car, and gets in his car.

Jim takes his mobile device 804 and places the mobile device in a car dock 802 which Jim had previously mounted to his car windshield. As described throughout this document, Jim's mobile device 804 determines that the mobile device has been docked, and determines that the type of dock is a car dock 804 (e.g., as opposed to a desktop dock).

Jim may never have placed the mobile device 804 in the car dock 802 before. Thus, upon Jim placing the mobile device 804 in the car dock 802, the mobile device displays the configuration dialog box 806. The configuration dialog box 806 includes a first user interface element 808 that enables Jim to activate wireless communication between the mobile device and the dock for using the dock as a "speaker phone," and a second user interface element 810 that enables Jim to activate wireless communication between the mobile device and the dock for using the dock to audibly output "music and media."

Jim would like to use the full capabilities of the dock, and thus selects both options by tapping on the selectable user interface elements, which show check marks upon user selection. Jim would also like the mobile device 804 to remember his selections so that the dialog box 806 does not appear upon a subsequent docking. Thus, Jim selects the "Remember Settings" interface element 812. Jim then selects the "OK" interface element 814, which causes the dialog box 806 to be removed from display. In some examples, Jim may go to a "settings" user interface page to change his wireless settings because the dialog box 806 may no longer appear upon docking. In some examples, the dialog box 806 does not include the "Remember Settings" interface element 812, and the dialog box 806 only appears the first time that the mobile device is docked with a particular dock or type of dock.

User selection of the "OK" interface element 814 may trigger activation of wireless communication between the mobile device 804 and the dock 802 based on the selected settings. Thus, if an incoming telephone call is received while the device 804 is docked, the ringing and audio from the party that is calling Jim may be output over the dock speakers instead of the mobile device speakers. In other words, the mobile device 804 wirelessly transmits to the dock 802 data that encodes an audio signal of the incoming telephone call ring and audio of the voice of the calling party. The dock 802 may receive the data, and from the data, generate an audio signal to audibly output over the dock's speakers.

Also, the dock 804 may include a microphone 816 that may be activated when telephone calls are initiated or received when the mobile device is docked and when the "speaker phone" setting has been selected. During the telephone call, Jim may speak into free space even though his mobile device 802 is an arm's length away from Jim. The microphone that is in the dock may be designed to work adequately at an arm's length distance where, for example, the microphone in the mobile device 804 may be at least partially obscured by the dock and may have been designed to work preferably for audio that is spoken within several inches of the mobile device.

Further, because Jim has selected to use the dock for "music and media" audio, when Jim launches an application program that has registered with the mobile computing device 804 as an application program for playing media files (e.g., songs, audiobooks, or video files), audio that is output by the application program may be wirelessly transmitted to the dock for audible output. Thus, Jim may audibly output media files over the dock's speakers by placing the mobile device in the dock. On the other hand, if Jim had not selected to use the dock for "music and media," the mobile device 804 may have audibly output the audio through the speakers of the mobile device 804, or through a 3.5 mm headphone jack of the mobile device 804 (if a line is plugged into the headphone jack). Thus, if Jim wishes to run audio through a 3.5 mm audio line of the mobile device 804, Jack may not want to select the "music and media" interface element 810.

Upon Jim selecting the "OK" interface element 814, the dialog box 806 may disappear and the car dock specific desktop 818 may display without obstruction by the dialog box 806. The car dock specific desktop 818 may include six selectable interface elements for launching six corresponding application programs. For example, Jim may select the "Navigate" interface element 820 to launch an application program that provides driving directions from a present location of the mobile device to a user-input location. Selection of a "Call" interface element 822 may launch an application program that allows Jim to place a telephone call with the mobile device 804.

Selection of a "Voice Search" interface element 824 may launch an application program that allows Jim to audibly speak a query and, in response, the mobile telephone may display a list of search results. Selection of a "Contacts" interface element 826 may launch an application program that causes the mobile device 804 to display a list of Jim's contacts. Selection of a "Music" interface element 828 may launch a media player application program. Using the media player application program, Jim may navigate a media collection and select a media file for audile and/or visual output by the mobile device 804. Selection of the "Exit Car Mode" interface element 830 may cause the car dock specific desktop 818 to disappear and be replaced by a desktop that is displayed during an undocked state of the mobile device (even though the mobile device may remain in the dock).

As illustrated in FIG. 8, the car dock specific desktop 818 is rotated to present the display in landscape mode (e.g., a mode where a default orientation of text is presented to read along a longest dimension of the display, or a mode where a vertical orientation of display content appears along a shortest dimension of the display). In some examples, the car dock specific desktop 818 is displayed in landscape mode regardless of an orientation of the mobile device 814, while a display of the desktop while the mobile device is not docked may appear in either landscape mode or portrait mode, depending on an orientation of the mobile device 804 (e.g., as determined by an accelerometer sensor). In some examples, upon the mobile device 804 being placed in the car dock 802, the touch sensor buttons 832*a-d* are deactivated so that the buttons do not cause a change to the display if selected. The touch sensor buttons 832*a-d*, however, may be active when the mobile device is not docked, or when the mobile device is in a different type of dock.

A background display 834 is displayed as lying behind partially transparent selectable interface elements 820-830 (elsewhere referred to as application program shortcuts). In some examples, the background display changes at least partially based on the geographical position of the mobile computing device. In this illustration, the background illustrates an image of the ocean. For example, Jim may be driving up U.S. Route 101 along the Oregon west coast and an image of a place that is nearby Jim's location may be retrieved from a server and may be displayed as the background display. If Jim were driving through the mountains, an image that includes mountains may be selected.

In some examples, the background display is of a map, where the map pans as a location of the mobile computing device changes. For example, the map may show an overhead view of streets that are nearby the mobile computing device's present location, and an icon that represents a current location of the mobile computing device. As the geographical position of the mobile computing device changes, the display of the map may change. For example, when Jim is in Oregon, the map may show a display of the region of Oregon around Jim. As Jim drives north and reaches Seattle, the map may pan to show a map of Seattle. The map may appear as the background display upon Jim docking the mobile device, without Jim supplying any user input subsequent to docking.

Figure 9:
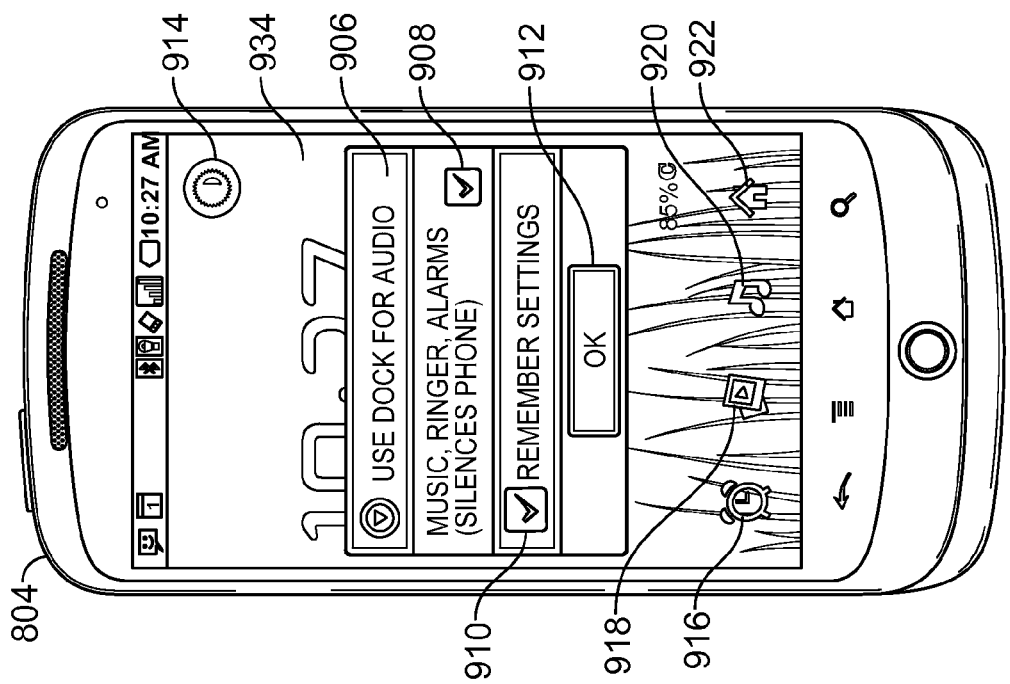
FIG. 9 shows an example user interface profile that is displayed by a mobile computing device upon docking in a desktop dock.

FIG. 9 shows an example user interface profile that is displayed by a mobile computing device upon docking in a desktop dock. The user interface includes a configuration dialog box 906 that includes an interface element for activating use of the dock for music, ringer, and alarm audio (but may silence other audio events). Like the configuration dialog box 806, the dialog box 906 may be presented a first time that the mobile device 804 is placed in the desktop dock, or if the mobile device 904 is placed in the desktop dock a subsequent time but if a user did not previously select the "Remember Settings" interface element 910.

When the mobile device 804 is docked in the desktop dock, the mobile device 804 presents a user interface desktop 934 that is specific to the desktop dock, and that is activated upon placing the device 804 in the dock. The user interface includes a contrast interface element 914 that, when selected, may dim the screen to facilitate use of the docked device as a bedside clock. The user interface includes an alarm interface element 916 that a user can select in order to set or cancel alarms. In some examples, the next scheduled alarm is displayed on the desktop (e.g., behind the dialog box 906).

The photo interface element 918 may be selected to display an interface for viewing pictures or a slideshow of pictures. The media interface element 920 may be selected to launch an interface for playing media that is stored on the mobile device 804, or that the mobile device 804 can access over a network. The home interface element 922 may be selected to bring a user back to a display of a desktop user interface that is displayed when the mobile device is undocked.

Figure 10:
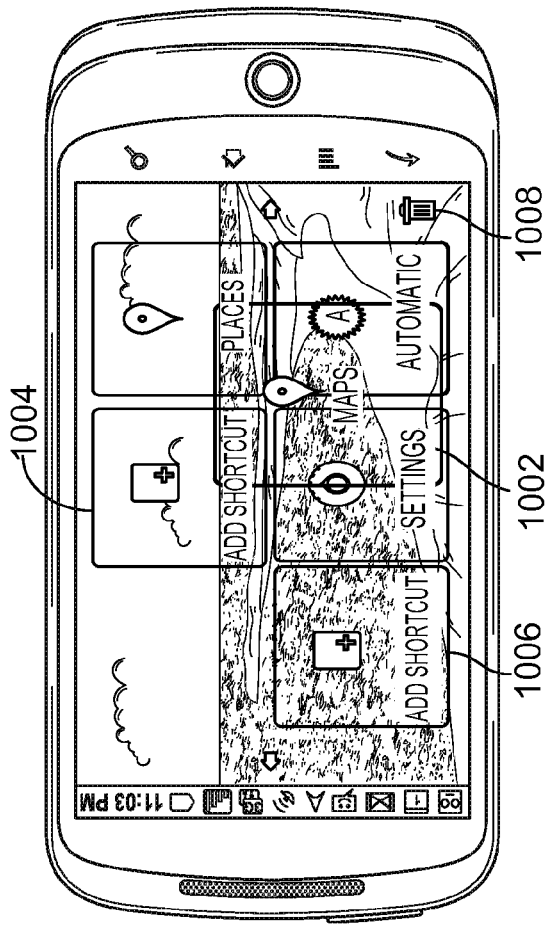
FIG. 10 shows a modification to an example user interface profile that is displayed by a mobile computing device upon docking in a car dock.

FIG. 10 shows a modification to an example user interface profile that is displayed by a mobile computing device upon docking in a car dock. In this example, a user may modify the desktop by dragging application program shortcuts (e.g., graphical interface elements that, when selected, cause the mobile computing device to launch a corresponding application program) to different locations, deleting application program shortcuts, and adding new application program shortcuts.

For example, a primary user input selection (e.g., a single tap with a finger) of the "Maps" application shortcut 1002 may cause the mobile device to launch the maps application program. A secondary user input selection (e.g., a single press and hold with a finger) of the same "Maps" application shortcut 1002 may invoke a user interface state that allows moving the "Maps" application shortcut 1002.

In FIG. 10, a user has pressed the Maps application shortcut 1002, held the shortcut to invoke a modifiable user interface, and is in the process of moving the shortcut 1002 to a different location. Upon user terminating user contact with the display, the shortcut 1002 may move to a selected location (e.g., a location in the two-by-three-grid of interface elements that is closest to the location of release). Other interface elements may shift to different grid positions if the selected grid position is occupied. The user may alternatively drag the shortcut 1002 to the trash icon 1008 in order to remove the shortcut 1002 from display.

In various examples, each location in the grid that does not include an application program shortcut may display an interface element that, when selected, prompts a user to add an application program shortcut at the displayed location (e.g., with the text "Add shortcut"). The "Add shortcut" interface elements (e.g., interface elements 1004 and 1006) may appear in the empty slots of the desktop grid during a first display of the user interface upon docking the mobile device, or may appear only upon the user interface entering a "modifiable" state (e.g., upon the user providing a long press to either an application shortcut or a blank location in the desktop).

Figure 11:
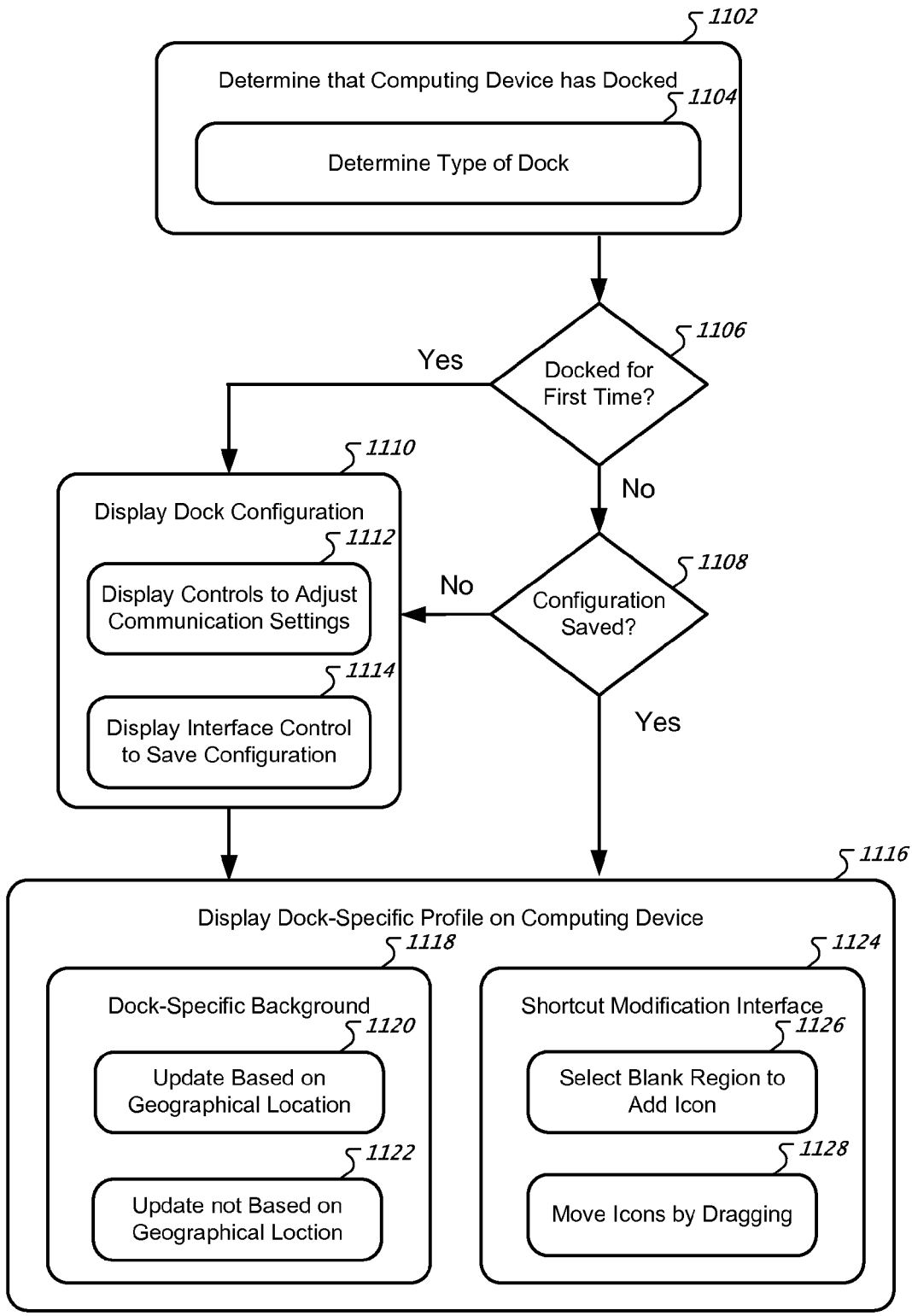
FIG. 11 shows a flowchart of an example process for displaying a dock-specific profile.

FIG. 11 shows a flowchart of an example process for displaying a dock-specific profile. In box 1102, a mobile computing device determines that the device has been docked, for example, by identifying that an electrical signal is being received from the dock. The determination that the device has been docked may include determining a type of the dock (box 1104). The type of dock may be determined based on a serial digital signal that the mobile device receives from the dock. The dock determination operations are described in more detail throughout this document, for example, with reference to FIG. 7.

In box 1106, the mobile device determines whether the device has previously docked with the type of dock. For example, the device, when docked, may store an indication that the device has docked. Thus, upon a subsequent docking, the mobile device can check to see if the indication is stored, and, if the indication is not stored, the device may determine that it has not previously docked with the type of dock. In various examples, the indication is stored by the dock and is transmitted to the mobile device upon docking. If the mobile device is being docked for the first time, the dock configuration interface may be displayed (box 1110). In various examples, the indication identifies a type of the dock, so that the configuration interface may be displayed only when a device is docked for a first time with a particular type of dock, even though the device may have previously docked with other types of docks.

In box 1110, a dock configuration user interface is displayed. In some examples, the configuration user interface is specific to the dock. In other words, the mobile device may be configured to dock with multiple types of docks, and a different configuration interface may display for each dock. For example, the dialog box 806 may be displayed the first time a mobile device is docked with a car dock, and a dialog box 906 may be displayed the first time the mobile device is docked with a desktop dock.

In box 1112, the configuration user interface displays user interface controls that enable a user to adjust communication settings between the dock and the mobile device. In various examples, the user interface controls enable the user to activate settings for wirelessly transmitting specific types of information between the dock and mobile device. For example, activation of a first setting may cause the mobile device to transmit to the docking system audio that is generated by one or more media player application programs. Activation of a second setting may cause the mobile device to transmit to the docking system audio that is received during a telephone call, and to receive from the docking system audio that a microphone in the docking system receives during a telephone call. Activation of a third setting may toggle whether the mobile device terminates a wireless connection with the dock upon undocking, or whether the wireless communication persists upon undocking.

In box 1114, the configuration user interface displays a user interface control for saving a current configuration (e.g., a current user activation of settings). For example, if the user selects the user interface control 910, the user settings may be stored upon selection of the "OK" button 912. Thus, upon subsequent docking of the mobile device with the same dock or type of dock, the configuration user interface may not be displayed. Instead, the user interface desktop 934 may display without presentation of the configuration dialog box 906.

Accordingly, at box 1108, a determination is performed whether the mobile device should present a configuration display when the device has been docked, but the device is not being docked for a first time. If the configuration settings have not been saved (as described above with reference to interface control 910), the configuration user interface may be displayed again. If the configuration settings have been saved, the configuration user interface may not be displayed.

Regardless, upon docking, a dock-specific user interface profile is displayed to a user (box 1116). The dock-specific user interface can include the display of the dock configuration user interface in the above-described circumstances (box 1110), and can also include a display of a dock-specific background (box 1118), or a shortcut modification interface (box 1124), among various examples.

In box 1118, the mobile computing device displays a dock-specific background. In some examples, a background is a display that is presented as a backdrop to a set of icons that a user may select for launching corresponding application programs. These icons may be referred to as application program shortcuts. The application program shortcuts may each reference an application program that the user has downloaded to the mobile device from an application store.

The combination of the application program shortcuts and the background is referenced herein as a mobile device "desktop." The desktop may be a first display that is presented to a user upon docking a device, or upon acknowledging settings in a configuration screen. The desktop may be a first display that is presented to a user upon turning the device on, and possibly navigating past an authentication interface or a device unlocking interface. The desktop may display upon user selection of a hardware button (e.g., the button 832c).

In some examples, the background display is updated based on a geographical location of the mobile computing device (box 1120). For example, the background display may include a geographical street map, and the displayed portion of the street map may change as the mobile device geographically moves so that a center of the street map continuously corresponds to a location of the mobile computing device on the street map.

In some examples, the background updates for a specific type of dock, but not for another type of dock. For example, the background display may not update based on a geographical location of the mobile computing device when placed in a second type of dock (box 1222). For example, the background may update periodically to include another picture from a collection of the user's photographs. The selection of the picture may not be based on geographical location, however. Accordingly, whether or not a background updates based on geographical position may depend on a type of dock.

In box 1124, a shortcut modification interface is displayed by a mobile computing device. For example, the user interface of FIG. 10 may be displayed to a user when the mobile device is placed in a car dock. The shortcut modification interface may display a collection of application program shortcuts in a grid, where each application program shortcut may be snapped to a grid location. In this example, those locations that do not include an application program shortcut include an icon that may be selected to generate an application program shortcut (e.g., icons 1004 and 1006).

User selection, for example, of icon 1004 may invoke a user interface for selecting an application program that an application program shortcut that is generated in the selected location may launch. In various examples, every position in the grid that is not occupied by an application program shortcut includes an icon for generating an application program shortcut. In various examples, the icons for generating the application program shortcuts are displayed upon entering a state for modifying the desktop, for example, upon selection of an "Edit Desktop" user interface element.

In box 1128, an application program shortcut (e.g., interface element 1002) is moved by dragging the application program shortcut to a new location in the grid. If the new location already includes an existing application program shortcut, the existing application program shortcut may change in visual appearance (e.g., to highlight a border). Upon release of the application program shortcut that is being moved, the application program shortcut may "drop" into the new location, and the application program shortcut that was at the new location may move to a different location.

Accordingly, with respect to docking of a device, various actions are disclosed that may occur automatically (i.e., without user intervention) when a user docks their mobile computing device to a base or dock. For example, the device can recognize an environment that is associated with the dock and may change modes to match that environment.

The mode of operation of the device may change automatically in response to the device being docked. In general, the mode of operation may be changed so that the current mode of operation matches the environment or context in which the mobile computing device has been determined to of been placed. For example, if the environment is determined to be a dock attached to a video monitor, the mode of operation may be changed by launching a media player and arranging the media player to display videos that are available for playing on the device.

In contrast, if the dock is determined to be a music dock, the media playing application may be launched again, but a library of the user's music may be highlighted on the device. If the dock is determined to be an automotive dock, the device may be placed into a mode appropriate for activities in an automobile, such as a mode that shows a mapping application or a navigation application, and a GPS unit on the device may be turned on and activated automatically so as to enable real-time updating of the mapping application or navigation application.

Effect of Undocking a Mobile Computing Device

Figure 12:
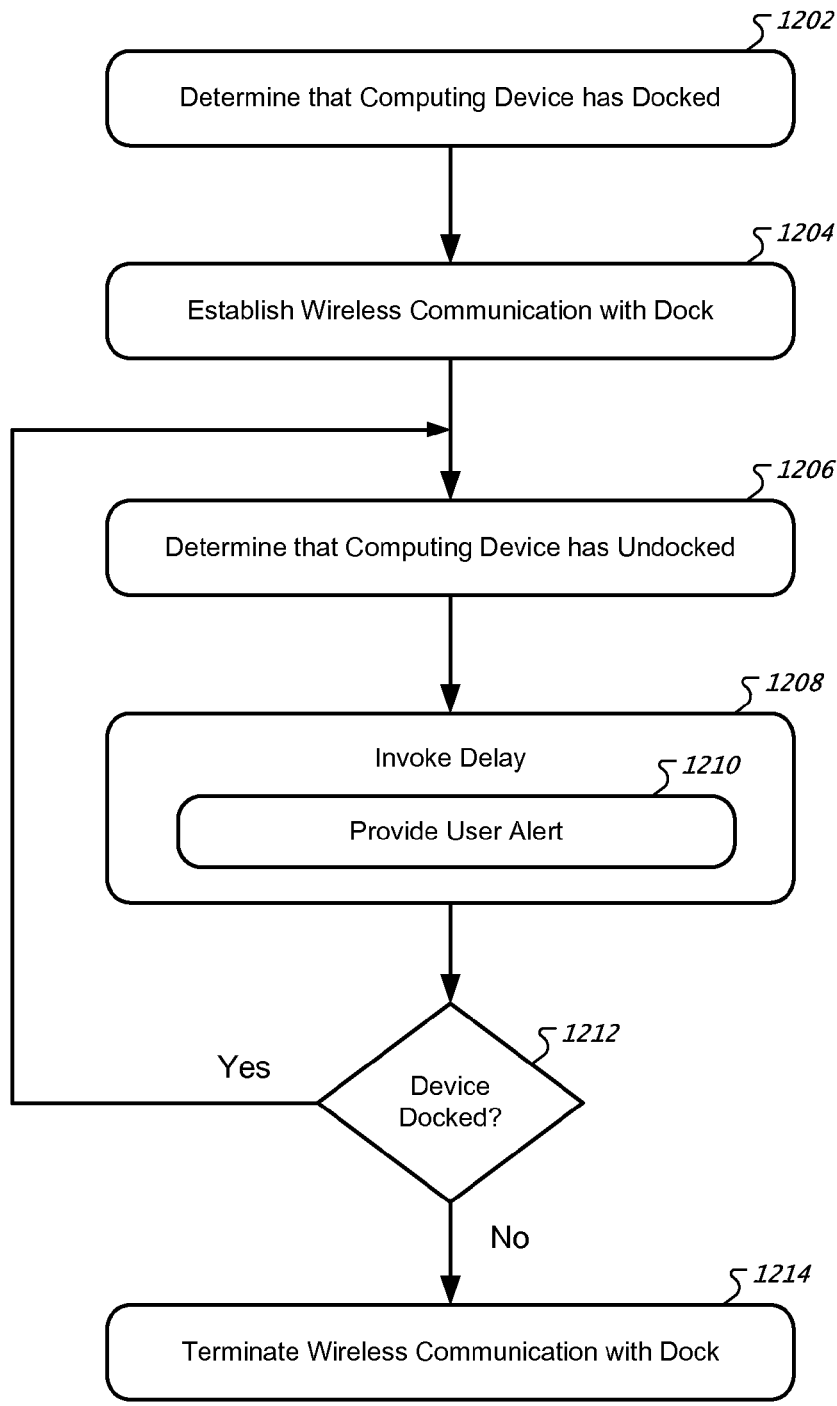
FIG. 12 shows an example flowchart for delaying wireless termination upon undocking of a mobile device.

FIG. 12 shows an example flowchart for delaying wireless termination upon undocking of a mobile device. As described throughout this document, a mobile computing device may establish wireless communication with a dock upon placement in the dock. The mobile device may subsequently be removed from the dock for a short period of time without termination of the wireless communication session. If the mobile device is placed back in the dock within the period of time, the wireless communication may not be interrupted.

As an illustration, the mobile device may be placed in the desktop dock that is described throughout this document. Because the mobile device may gently rest in the desktop dock without significant restraint, a user may unknowingly cause disruption of physical electrical power or communication transfer between the mobile device and the dock when touching the mobile device's screen. Further a user may accidentally knock the mobile device out of the dock, or may remove the mobile device from the dock and shortly thereafter decide that the user does not want the device to transition to an undocked graphical interface. In all of these cases, the user may quickly place the device back into the dock without termination of the wireless communication session. Rather, a wireless communication session may only terminate if the mobile device remains undocked a predetermined amount of time (e.g., two seconds).

In box 1202, a mobile computing device determines that the mobile computing device has been docked. For example, the mobile computing device may receive an electrical signal that indicates that the mobile device has been physically placed in a dock. Various mechanisms for determining that a mobile device has been docked are described throughout this document.

In box 1204, wireless communication between the mobile device and the dock is established. For example, the dock may transmit to the mobile device a dock identification number, a BLUETOOTH address, and a BLUETOOTH pin code. The mobile computing device may use the received information to establish wireless communication (e.g., a BLUETOOTH wireless communication session) with the dock. As described throughout this document, the mobile device and the dock may use wireless communication to exchange media data (e.g., music or video data).

In box 1206, the mobile computing device determines that the device has undocked. The determination may be performed by sensing a termination or change in a signal that the mobile device had used to determine that the device was docked. For example, if the mobile device determined that the device was docked by sensing that the device received electrical power for charging a battery, the mobile device may determine that the device is no longer docked when the device senses that the electrical power ceases. In some examples, the mobile device receives a periodic signal over the physical data connection that provided the dock identification data, and cessation of the periodic signal may indicate that the mobile device is no longer docked. In some examples, the dock determines that the mobile device is no longer docked and wirelessly transmits an indication to the mobile device informing the mobile device that the device is no longer docked.

In box 1208, the mobile computing device invokes a delay before the mobile device terminates the wireless communication with the dock. In some examples, the mobile device queues a message to terminate the wireless communication with a one-second delay. In some examples, the mobile device activates a one-second timer without placing the termination message in a queue (and executes the termination upon expiration of the timer, as described below). In various examples, the delay may be 0.2 second, 0.5 seconds, 0.8 seconds, 1.0 seconds, 1.5 seconds, 2 seconds, 5 seconds, or 10 seconds.

In box 1210, a user alert is provided. For example, upon a mobile device determining that it is undocked, the mobile device may audibly beep or wirelessly provide a beeping audio signal to the dock for audible output. In some examples, the mobile device may display a prompt on the mobile device's display. In some examples, the mobile device or dock may flash a notification light.

In box 1212, the mobile device determines if the device has been docked. For example, the mobile device may identify if the determination that was described with respect to box 1202 is performed again. If the mobile device is re-docked during the delay period, the queued message to terminate the wireless communication may be deleted. On the other hand, if the mobile device is not re-docked during the time period of the delay, the wireless communication may be terminated (as described with reference to box 1214).

In box 1214, the wireless communication between the mobile device and the dock is terminated. For example, the mobile device may send a command to break down the wireless communication session, or vice versa. The wireless communication may remain inactive until the mobile computing device is docked yet again.

In various examples, the operations of boxes 1202 through 1214 are performed without receipt of user input. Instead, a user's only contact with a mobile device may be manipulation of the mobile device in relation to a location of the dock.

FIG. 13 shows a user interface of a mobile computing device that has been removed from a dock, but that remains in wireless communication with the dock. As described throughout this document, for example with reference to FIG. 12, a mobile computing device that is placed in a dock may establish wireless communication with the dock. A user may adjust configuration settings to define an effect of undocking on the wireless communication. In some examples, the user may prefer that the mobile device terminate the wireless communication after a brief time period (e.g., as described with reference to FIG. 12). In other examples, the user may prefer that the mobile device remain in communication with the dock.

As an illustration, a user of a mobile computing device, Jim, may place his mobile device in a dock, and may play a music album from his electronic media library. The mobile device may wirelessly transmit the music to the dock, and the dock may audibly output the music over a stereo system that Jim has connected to the dock via an audio output cable.

Jim moves around his living room performing chores and listening to the music, until the music suddenly dims and is replaced by the sound of a ringing telephone. Jim speaks "Answer Call" into free space, a microphone in the dock picks up Jim's words, and the dock wirelessly transmits the words to the mobile device. The mobile device may use a speech recognition system to determine whether the received audio includes a spoken command. In this example, the spoken command "Answer Call" causes the mobile device to perform an action to answer the incoming telephone call. Jim chats with the calling party for a while, and the calling party's voice is output over Jim's stereo system. After saying goodbye, the calling party hangs up, ending the call. The music resumes playing over the stereo system.

Jim may decide to do chores in another room, and thus walks over to the dock and pulls the mobile device out of the dock. Because Jim has configured his mobile device so that the wireless communication continues when the device is undocked, the music may continue to play over the speakers even though Jim has walked into the other room with his mobile device.

In some examples, upon Jim undocking the mobile device, an undocked/communicating user interface profile is presented, where the undocked/communicating user interface profile is specific to the mobile device being undocked but wirelessly communicating with the dock. In various examples, the undocked/communicating user interface profile is different than a docked user interface profile that is presented while the mobile device is docked, or an undocked/non-communicating user interface profile that is presented while the mobile device is undocked but is not in wireless communication with the dock. The mobile computing device may, in various examples, switch from the undocked/non-communicating profile, to the docked profile, to the undocked/communicating profile without receiving user input. The user may only manipulate the mobile device in to and out of the dock.

An example undocked/communicating user interface profile is shown in FIG. 13. In this figure, the mobile computing device is displaying a dock control interface 1302 over a desktop display 1330. In some examples, the dock control interface 1302 may appear automatically upon undocking without receipt of user input. In some examples, a user may toggle display of the dock control interface 1302 with selection of an icon 1332 that displayed in the mobile device's status bar. The icon 1332 may appear when the mobile computing device undocks.

The dock control interface 1302 includes interface elements for modifying dock operation and modifying the type of data that is communicated to the dock. For example, the dock includes a first button 1306 for increasing dock volume and a second button 1308 for decreasing dock volume. Upon user selection of the increase volume button 1306, the mobile device may transmit a command to the dock to amplify the audio signal that the dock is outputting over its speakers. The dock may receive the command and may change a gain of an amplifier that is part of the dock.

The dock control interface 1302 may display controls for each application program that is communicating with the dock. In this example, Jim has previously launched a media player application program, which is playing a music album. As a result, controls that are specific to the media player application program are displayed in the interface 1302. For example, the interface 1302 includes a "Pause" media file button 1312 and a "Next" media file button 1314.

The dock control interface 1302 includes an "Options" button 1316. User selection of this button may cause the interface 1302 to expand so that additional options can be displayed. Example additional options include configuration options for managing wireless communication between the mobile device and the dock. Another set of options can include a list of application programs which may be activated for communication with the dock, but which are not presently active (e.g., a telephone application program, a baby monitor application program, and a game application program that can be played in cooperation with the dock).

The dock control interface 1302 may also include a "Disconnect from Dock" button 1318, which upon user selection may cause the wireless communication to terminate. In some examples, application programs that are communicating with the dock are terminated, or are placed in a waiting state (e.g., the media player application program may pause a playing of a music album), upon disconnection. In some examples, the dock control interface 1302 may disappear from display (and the icon 1332 may disappear) upon disconnection. In some examples, the dock control interface 1302 may not appear until the user has again docked the device, and has removed the device from the dock. In other examples, the dock control interface 1302 may appear when the device is docked.

FIG. 14 shows another user interface of a mobile computing device that has been removed from a dock, but that remains in wireless communication with the dock. The mobile device 1402 may store an indication that the device is undocked but in wireless communication with the dock.

Thus, the mobile computing device, and application programs that are installed on the mobile device, may take advantage of an ability to determine whether the mobile device 1402 is wirelessly communicating with the dock.

For example, a user of the device 1402 may launch an application program for a car racing video game. The video game may be configured to execute in two display modes. If the mobile computing device is undocked, but is not wirelessly connected with a dock, the video game may display on a single display (e.g., only the display of the mobile computing device). The single display may include controls for moving the car, along with a view of the active game content (e.g., a view of the car which the user is controlling).

If the mobile computing device is in undocked but is in wireless communication with the dock, the video game may display on two displays (e.g., the mobile device and an auxiliary display 1404 that is connected to the dock through an auxiliary video output). In this example, the application program displays the active game content on the auxiliary display 1404, and the controls for moving the car on the mobile device 1402. Accordingly, the mobile device, when wirelessly connected to a dock, may enter a state that visually or audibly outputs information that is different than the visual or audible output when the mobile device is not in wireless communication with the dock.

In this example, wireless communication of video data to the auxiliary display 1404 is illustrated by the wireless signal 1406. The wireless signal, however, may be transmitted to a dock, which may transmit the signal to the display 1404 over a cable.

Figure 15:
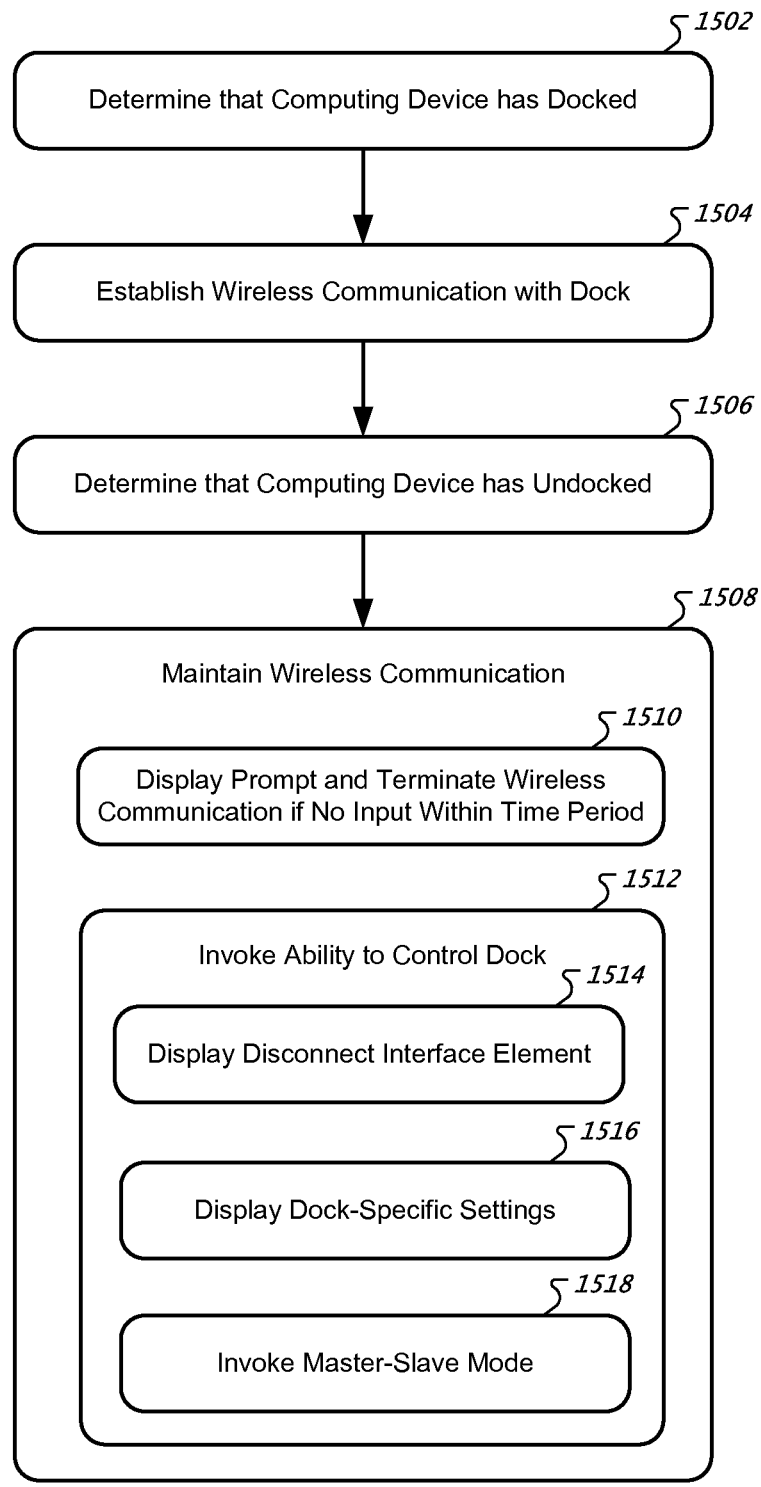
FIG. 15 shows a flowchart of an example process for maintaining a wireless connection upon undocking.

FIG. 15 shows a flowchart of an example process for maintaining a wireless connection upon undocking. In box 1502, a mobile computing device determines that the device has docked. As an example, the mobile device may receive an electrical signal that was transmitted by the dock, and that indicates that the device has been docked.

In box 1504, the mobile device, upon determining that the device is docked, establishes wireless communication with the dock. For example, the mobile device may receive a BLUETOOTH address from the dock, and may establish a wireless connection with the dock using the BLUETOOTH address.

In box 1506, the mobile device may determine that the device has undocked. For example, the mobile device may determine that the electrical signal described above with reference to box 1502 terminates.

In 1508, the mobile computing device maintains the wireless communication with the dock even though the mobile device may no longer be docked. The communication may remain in effect for an extended period of time (e.g., one minute, five minutes, or sixty minutes), and may terminate, for example, upon (i) the mobile device turning off, or (ii) the user providing user input that causes the mobile device to terminate the wireless communication.

In box 1510, the mobile computing device displays a prompt upon undocking. The prompt may state that the wireless communication may terminate if the user does not provide user input within a defined time period. For example, the prompt may include, for example: (i) text that states "Maintain Wireless Connection?", (ii) a selectable interface element that states "Remain Connected", and (iii) a selectable interface element that states "Disconnect." In some examples, the prompt includes a visual identification of a time that is remaining before the wireless communication terminates. For example, the prompt may include a numerical countdown in seconds, or may include horizontal bar that expands across the display. In various examples, the prompt is displayed within 0.5 seconds, 1 second, 3 seconds, or 5 seconds of the mobile device being undocked. The prompt may display without the user providing user input after the undocking.

Such operation by a mobile telephone may involve "Opt-In" maintenance of the wireless communication. In another example, the user is provided a prompt to "Opt-Out" of the wireless communication. If the user does not provide input during the defined time period of display for the prompt, then the prompt may disappear and the wireless communication may remain connected. For example, the prompt may state "Disconnect Wireless Connection?"

In box 1512, the user of the mobile device is provided an ability to control the dock's operation via the wireless communication. For example, upon undocking, the mobile computing device may display the dock control interface 1302 of FIG. 13 (or may allow the user to select the dock icon 1332 upon disconnection). The dock control interface 1302 may include a disconnect interface button 1318 that allows a user to terminate the wireless communication (box 1514).

In some examples, the dock control interface 1302 may include dock-specific settings (box 1516). For example, the mobile computing device may be able to connect with two different types of docks, but only one of the types of docks may include speakers and an amplifier. Thus, the dock volume buttons 1306 and 1308 may only display upon docking/undocking to the dock with the speakers. The dock volume buttons 1306 and 1308 may not be displayed upon docking/undocking to a dock that does not include the speakers.

In some examples, the dock-specific settings are selectable user interface elements that are displayed when the mobile device has been docked/undocked, but not when the mobile device is presently docked. The dock-specific settings may be displayed for multiple types of docks.

In box 1518, the mobile computing device invokes a master-slave mode. As an example, upon undocking, the user may launch a television application program. Data for displaying a television channel may be received at the mobile computing device over a network, and the mobile computing device may transmit the data to the dock. The dock may forward the data over an auxiliary output line to a television, which may display the television channel to a user. The mobile device, however, may not display the television channel. Instead, the mobile device may operate as a master device that presents options to the user for modifying the display of the television channel (e.g., options to change the channel, fast forward, or rewind). Thus the mobile device may operate as a master device that controls the operation of the slave device and that provides content for display on the slave device (e.g., the dock/television combination).

In various examples, a device when docked may make only an electrical charging connection through the physical docking interface, and may separately and automatically make a wireless connection to the dock or to a device that is associated with the dock. For example, when a device is docked to a speaker system, the device may begin charging and may also establish a BLUETOOTH or similar connection to the speaker system for playing music stored (e.g., in MP3 format) on the device over the speaker system. In this manner, when the device has charged, the user can take it out of the dock while the music continues playing, and the user could, for example, walk around and use the device, in effect, as a remote control for the speaker system (within the range of the wireless interface).

A wireless data connection of a may be created whenever the dock and mobile computing device are connected. For example, a wireless handshaking function may occur between the two devices, and the devices may then exchange information that identifies the type of dock, and thus the context in which the device has been talked.

In various examples, separate wired and wireless connections may be made between a mobile computing device and a dock, or a device associated with a dock, when the mobile computing device is physically docked. The wired connection may be a power connection in a familiar manner, and may be used to recharge the mobile device while it is docked. A wired data connection could also be provided, but that data connection may be broken if and when the mobile computing device is removed from the dock. Thus, as an alternative to, or in addition to, the wired data connection, a wireless data connection may be formed automatically when the docking occurs. Such a connection may be used to transfer files or other information between the mobile computing device and the dock or a device associated with the dock, even after the device has been undocked.

Thus, for example, a user may dock their portable computing device to a music or video system, and a wireless handshaking negotiation may occur to establish a data link between the wireless computing device and the dock. The user may then choose to begin playing a media file, and the media file may play through the dock such as when the dock is a speaker system, or through a device associated with the dock, such as a video monitor connected to the dock, where the dock provides for television playing, recording, and similar functions, such as personal video recorder functions. After a time period, the user may want to take the mobile computing device with them but continue playing the media file or files that are stored on the mobile computing device. The user may thus undock the device, and the data transmission may continue over the wireless interface between the mobile computing device and the dock. With the device undocked, the user may employ the device like a remote control, such as by moving throughout the user's home and changing media files, adjusting volume levels, changing rooms in which the media will be played, or other similar actions.

Determining a Change in Mode of Transportation

A mobile computing device may record a geographical location at which a user changed modes of transportation, for example, so that a user can find a location at which the user parked his car, locked his bicycle, or got on a public transportation system. As described in more detail below, the mobile device may determine the geographical location without the user providing user input.

Figures 16, 17:
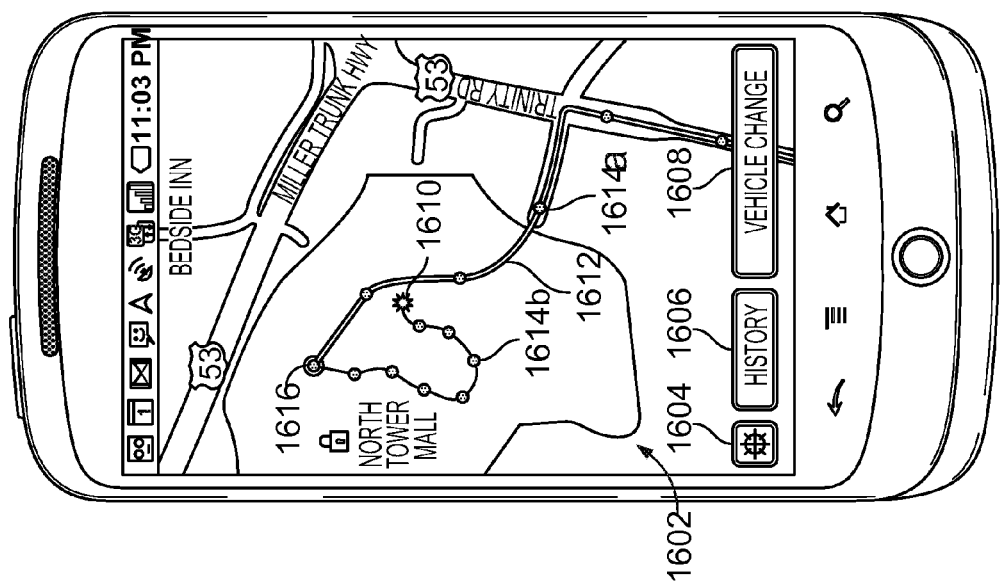
FIG. 16 shows an example user interface of a map that identifies a location at which a user changed his mode of transportation.
FIG. 17 shows an example display of data that may be used to determine a location at which a user changed his mode of transportation.

FIG. 16 shows an example user interface of a map that identifies a location at which a user changed his mode of transportation. In this example, the user has driven up Trinity Road and turned into the North Tower Mall parking lot. The user drove through the parking lot, parked his car, and got out to walk around the mall for a while. The user eventually decides that he is done shopping and walks outside into the parking lot. The user cannot find his car so he pulls out his mobile device and launches a "Maps" application program.

The maps application program displays an overhead view of a street map 1602. The map displays the last location that the user had viewed (e.g., a different part of the city), so the user selects the "present location" interface element 1604. In response, the map displays the area around the user's present location, and displays a blinking graphical interface element 1610 that illustrates the mobile device's present geographical location (e.g., as determined using cell phone transmitting tower triangulation or a satellite based positioning system).

The display of the user's present location does not help the user find his car, so the user presses the "history" interface element 1606. In response, the line 1612 is displayed on the map. The line 1612 illustrates a recent route of the mobile computing device based on periodically determined geographical locations of the mobile device. In some examples, each of the geographical locations may be illustrated with a graphical element (e.g., dots 1614*a* and 1614*b* may identify past geographical locations of the mobile device). The line 1612 may "connect the dots" with linear line segments or non-linear line segments. Non-linear line segments may be based, in part, on a trajectory of the mobile device, and may be based, in part, on known transportation routes (e.g., streets or public transportation lines that are near the geographical locations and which the mobile device is determined to be traveling along). During this view of the map 1602, the line 1612 may remain the same thickness and color throughout the entire route up to the user's present location.

Upon seeing the line 1612, the user may have a better idea of where his car is, but may not know be fully sure where upon the line he parked his car. Thus, the user may select the "vehicle change" interface element 1608. In response, the mobile device may determine that the device changed a transportation mode at location 1616 from a motorized vehicle to walking. Accordingly, the mobile device may display graphical interface element 1616 as being different than the graphical interface elements for the rest of the locations of the route. In this illustration, an extra circle has been drawn around geographical element 1616. In various examples, a size of the graphical element may be different, a style of the graphical element may be different, or a color of the graphical element may be different.

Further, the mobile device may determine that the user switched to a lower-speed form of transportation at interface element 1616 (e.g., switched from car to walking). Thus, the portion of the line 1612 between the geographical element 1616 and interface element 1610 may be narrower than the portion of the line 1612 that precedes interface element 1610. In various examples, the line 1612 may be divided into differently styled portions or differently colored portions.

As described in more detail below, the mobile device may use various mechanisms to determine a geographical location at which the device (and the user by inference) switches transportation modes. In a first example, the geographical location is selected as the location of the mobile device when the mobile computing device is undocked from dock. For example, the user may have placed the mobile device in a car dock, and the mobile device may be able to determine that an electrical signal from the car dock terminates when the user pulls the mobile device out of the dock. In a second example, the geographical location is determined based on a change in speed of the mobile computing device.

FIG. 17 shows an example display of data that may be used to determine a location at which a user changed his mode of transportation. A time column 1702 and position column 1704 display data that was periodically determined, for example, by a mobile computing device using Global Positioning System techniques. In this illustration, a new location was determined every minute. The time, however, may increment at more or less frequent intervals, and the interval length may differ between location determinations (e.g., based on a speed of the mobile device). In various examples, the location determinations are stored in the position column 1704 as geographical coordinates (e.g., latitude and longitude). The full coordinates are not displayed in this illustration for lack of space.

The speed data (column 1706) may be determined based on the time data and the position data. As an example, a distance between a first geographical location and a second geographical location may be determined. A time difference may be determined over the same interval. The distance may be divided by the time to determine a speed, which may be stored in association with either the first time or the second time.

In various examples, a moving average speed (column 1708) is determined. A moving average speed may be an average speed for a set of recent times. For example, a moving average for a particular time may be an average of a speed for the particular time and the speed for two preceding times (e.g., as illustrated in FIG. 17). Where position readings were not obtained at regular intervals, the moving average may be performed on all speeds that were calculated for a particular range of time (e.g., three minutes).

The moving average may be used to determine when a mobile device has dropped below a threshold speed for an extended period of time, as opposed to a temporary stop. As an illustration, a train may travel at 45 mph between stations, but may stop for thirty seconds every so often at a station. A user of a mobile device, however, may remain on the train through several station stops. When the user gets off the train, the user may begin walking and may thus not exceed a speed of four miles-per-hour for ten minutes.

With each passing minute the moving average may take less and less of the train speed into account. Thus, at some point, the moving average is only taking the walking speeds into account (or is only substantially taking the walking speeds into account) and the moving average speed drops beneath a threshold. At this point, the mobile device has determined that the user has switched transportation mode.

Still, now that the mobile device has determined that the user has switched to a different transportation mode, the mobile device may go back and determine a geographical location of the mobile device where the switch occurred. In some examples, the mobile device bounces backward in time until a speed of the mobile device is encountered that exceeds a walking speed. The location of the mobile device temporally after the encountered speed may be the geographical location where the change in transportation mode occurred (e.g., the best guess that the mobile device can make based on the set of data points).

In FIG. 17, the geographical position, time and speed at which the mobile device switched transportation modes is identified with circle 1710. For this example, the user is driving a car down the road. The user, at one point, stops the car at a traffic light and his average speed, at identifier 1712, drops to two miles-per-hour (the speed may not be zero miles-per-hour because the user may not have remained stopped at the traffic light for the entire minute between location readings). The moving average at the time 3:44 remains at 24.7 miles-per-hour because the moving average also accounts for the speeds at times 3:43 and 3:42. A few minutes later, however, the user turns into a parking lot and slows down, causing his speed to reduce to 11 miles-per-hour. Eventually the user parks his car, around time 3:49, and walks into the mall. The user walks for the next several minutes with his average speed per minute not exceeding four miles per hour. Thus, a time 3:49 is recorded as a time at which the mobile device determined that the user switched transportation modes.

Figure 18:
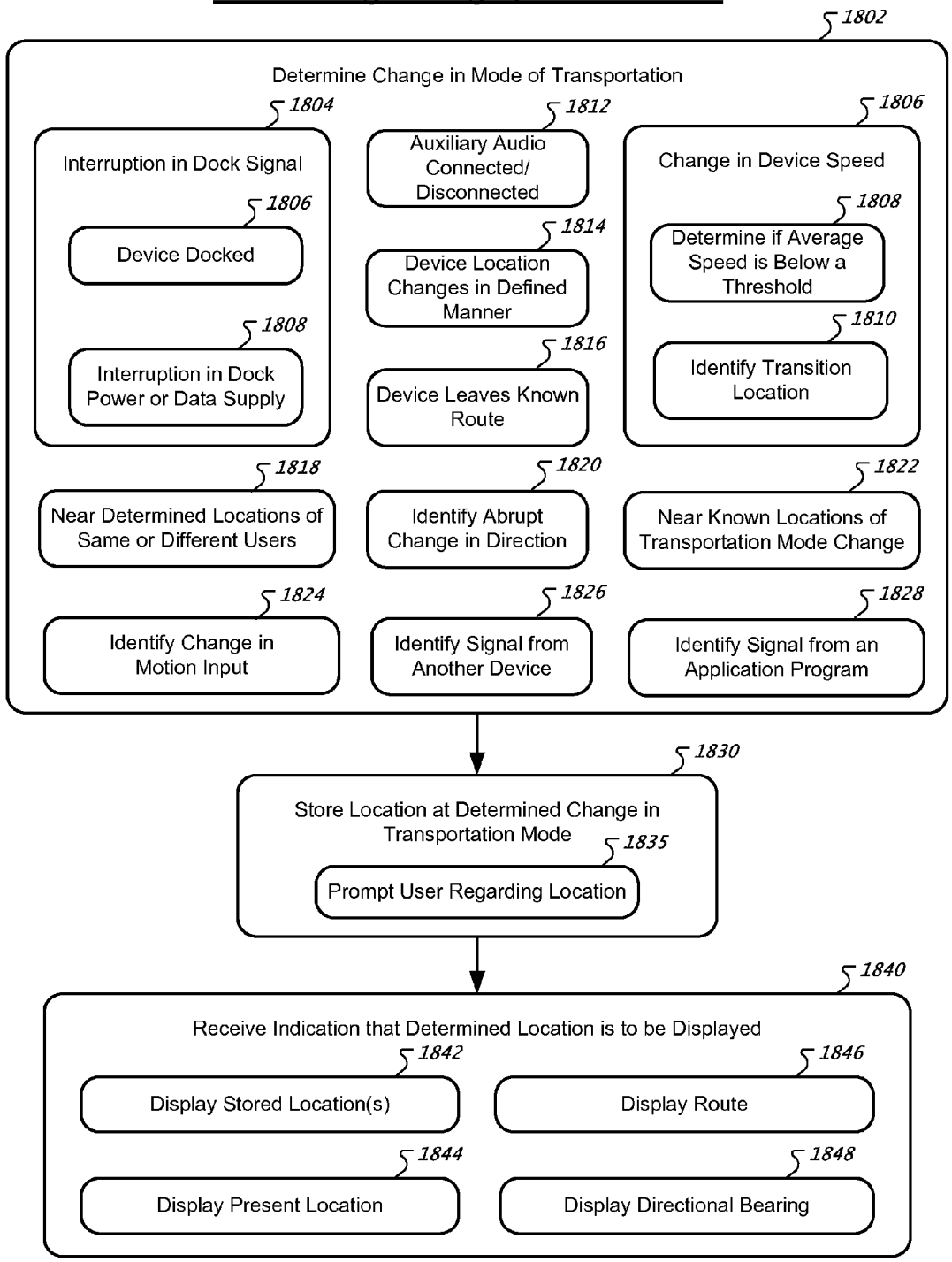
FIG. 18 shows a flowchart of an example process for determining a geographical location at which a user changed a mode of transportation.

FIG. 18 shows a flowchart of an example process for determining a geographical location at which a user changed a mode of transportation. In box 1802, a change in mode of transportation is determined. The change may be determined using, for example, any combination of the below described methods. Accordingly, a determined change in transportation mode may be probabilistically determined based on computer-automated mechanisms, and may or may not represent an actual physical change in transportation mode of a user.

In some examples, the change in transportation mode is determined based at least in part on an interruption of an electrical signal that the mobile computing device receives from a dock (box 1804). For example, the mobile device may be physically placed into a dock (e.g., the car dock of FIG. 4). The dock may provide electrical power to the mobile device using pin 432, and may communicate a digital signal to the mobile device using pin 428. As described throughout this document, the power that is provided through pin 432 may be used to charge a battery of the mobile device, and the pin 428 may be used to provide information for establishing a wireless communication between the device and the dock. In some examples, the device is determined to be docked when the device receives electrical energy that is wirelessly transmitted to the device by way of inductive coupling (e.g., through the use of a charging pad).

The mobile device may determine that the device is docked (box 1806) upon sensing a presence of either of these electrical signals. The mobile device may determine that the device has been undocked based on an interruption in either of these electrical signals (box 1808). A device that is docked may be determined to be associated with a first transportation mode, while a device that has been undocked may be determined to be associated with a second transportation mode.

In various examples, the mobile device may not receive, from the dock, an electrical signal that is indicative of undocking. Rather, the mobile device or dock may include a sensor that determines when the mobile device has been physically separated from the dock. The sensor may be a compression sensor, a proximity sensor, or a magnetic sensor, among various examples. In some examples, a determination that the mobile device has changed from a first transportation mode to a second transportation mode is performed if the device remains undocked for a predetermined time period (e.g., as described throughout this document).

In some examples, a change in transportation mode is determined based at least in part on a change in the device speed (box 1806). For example, the mobile device may repeatedly determine whether an average speed of the mobile device is below a threshold value (box 1808). The average speed of the mobile device may be calculated in various manners, but may remain an average speed of the device over a time period that is greater than two adjacent location determinations.

In a first example, the average speed is calculated as a moving average of multiple recent speed measurements. In a second example, the average speed is calculated as an average speed over a time period that is greater than two adjacent location readings. In other words, although the device may include location readings for each minute, an average speed may be calculated using a most recent location reading and a location reading from five minutes ago.

The mobile device may determine if the average speed falls below a threshold value. In some examples, the threshold value corresponds to a walking speed of an individual (e.g., 4.1 miles-per-hour). If the average speed falls below the threshold, the mobile device may determine that the transportation mode of the mobile device has changed. In various examples, an average speed is effectively calculated by determining that multiple successive speed determinations fall below the threshold.

Once the transportation mode is determined to have changed, the mobile device may identify the geographical location at which the transition in transportation mode occurred (box 1810). For example, the mobile device may step backwards from a most recently calculated speed, comparing each speed to a second threshold that may greater than the first threshold (e.g., 12 miles-per-hour), until the speed exceeds the second threshold. The geographical location of the mobile device temporally after the identified speed may be determined as the location at which the mobile device transitioned transportation modes. In other words, the determined location may be a geographical location at an at least temporary resting position of the mobile computing device.

In some examples, the second threshold is lower than the first threshold. The first threshold may be used to identify a change in transportation mode of the mobile computing device. For example, when a user pulls a car into a parking lot, the user may drive the car at a low rate of speed just before parking. Thus, the user may travel at a walking speed for a short while before actually parking. A combination of the slow driving and walking after exiting the car may be sufficient to cause the mobile device to identify a change in transportation mode.

The mobile device, however, should identify the location of the transition in transportation mode as the location where the user parked his car. In some examples, such determination may be performed using a second threshold that is lower than the first threshold, for example, a threshold that may be equivalent to being stopped or substantially stopped (e.g., one mile-per-hour). Because the user may stop occasionally when he is walking, the relevant stop may be the stop just after the user parked (e.g., the oldest substantially stopped speed during the period of time over which speeds were averaged in determining that the mobile computing device changed modes).

In various examples, a change in transportation mode may be similarly determined when a user moves from a low-speed transportation mode (e.g., walking) to a high-speed transportation mode (e.g., biking). For example, the mode may be determined to have changed when a mobile device exceeds a speed threshold for an amount of time. The geographical location of the transition may be the first speed that exceeds the threshold.

In some examples, the change in transportation mode is determined based at least in part on disconnection or connection of an auxiliary audio device (box 1812). For example, a user of a mobile device may connect a cable to the mobile device's audio output terminal (e.g., a 3.5 mm audio output jack). The cable may connect the mobile device to, for example, a car stereo or an FM transmitter. A removal of the cable may indicate that the car has stopped and that the user disconnected the auxiliary audio line so that the user could take the mobile device with him.

In other examples, the change in transportation mode is determined based on connection of an auxiliary audio device. For example, a user may listen to his car stereo while driving, but upon reaching a destination may exit the car and plug in headphones. The user may not be as likely to connect headphones to the mobile device while the user is in the car. Thus, connection of an auxiliary audio device may indicate a change transportation mode. In various examples, an external FM transmitter connects with the mobile device via Bluetooth pairing or a proprietary data connector.

In some examples, the change in transportation mode is determined based at least in part on the device location changing in a defined manner (box 1814). For example, the mobile device may be determined to be in a vehicle that is moving through a surface parking lot when the device moves in an "s" shaped route as a user seeks out an empty parking spot. The mobile device may be determined to be in a vehicle that is moving through a parking garage when the device doubles back over a previous geographical location, but with a change in altitude (e.g., a change in altitude that is greater than 2 meters).

The device or a server system may store several users' routes through a parking lot or garage, and may use the stored routes to identify when a mobile device deviates from the route. For example, as a user enters a parking garage in his car, the user (and his mobile device) may follow a same winding path through the parking garage as other users. When the user parks his car, however, the user's route may deviate slightly from the common route. Further, after parking, the user may walk in a direction that is opposite or tangential to the direction of car travel. Moreover, vertical movement of the mobile device (e.g., more than 5 meters) without substantial horizontal movement (e.g., more than 5 meters from a center point) may indicate that the user is walking up stairs or is taking an elevator, and thus is in a walking transportation mode.

In some examples, the change in transportation mode is determined based at least in part on the geographical location of the device leaving a known route (box 1816). For example, the mobile device may be de determined as traveling along a known rail line. If the mobile device changes trajectory to move away from the rail line, a determination that the mobile device has changed transportation mode may be achieved. Similarly, if the mobile device has been traveling along known roads and then begins traveling across a city park which is not known to have any preexisting vehicular transportation routes, a determination that the mobile device changed transportation mode may be achieved.

In some examples, the change in transportation mode is determined based at least in part on the device making an abrupt change in direction (box 1820). For example, the mobile device may have been traveling in graceful curves along a known rail route and suddenly leaves the rail route in a direction that is substantially back the same direction that the user came. Such a change in direction may be used, for example, to aid a determination that the device has left a known route, in distinction to the determined locations of the mobile device temporarily drifting away from the actual position of the mobile device due to inaccurate position estimations.

In some examples, the change in transportation mode is determined based at least in part on the device being near previously determined locations of changes in transportation mode for the device, or for users of other devices (box 1818). For example, the mobile device may determine multiple locations of transportation mode changes, as described throughout this document. These locations may be stored by a server system as associated with a user account, and may be used to influence a determination whether a particular mobile device has made a change in transportation mode.

As an illustration, a subway station or a parking lot may correspond to multiple determined changes in transportation mode (either of the user or of other users), while a freeway in the middle of Nebraska may not. Thus, a threshold or score that is determined using the described mechanisms may be modified so that the system is more likely to determine a change in transportation mode in the parking lot, as opposed to on the freeway (where a user may have ran into road construction). For example, the threshold value that must be achieved for determining that a geographical location of a mobile device has changed transportation modes may be lower when near previously determined changes in transportation mode, than when away from previously determined changes in transportation mode.

In some examples, the change in transportation mode is determined based at least in part on the device being near known locations of transportation mode change (box 1822). For example, a system may have stored in a database known locations of parking lots or known locations of subway terminals. Thus, a determination that a mobile device is in or near one of these locations may impact a determination whether a change in transportation mode has occurred.

Various combinations of the mechanisms described in boxes 1804 through 1822 may be used to determine whether a change in transportation mode has occurred. In examples where multiple mechanisms are used, each of the used mechanisms may contribute a component score for a particular geographical location to an overall score for the geographical location. When an overall score for a geographical location exceeds a threshold value, the geographical location may be identified as a location of transportation mode change.

In some examples, the change in transportation mode is determined based at least in part on the device identifying a change in motion input. For example, the mobile device may include an accelerometer that can determine multi-axis changes in acceleration. The accelerometer may be used to determine when the device changes from a first transportation mode to a second transportation mode. As an illustration, the mobile device may be able to identify that a repeating up and down movement corresponds to the motion of a walking individual. A transition from this repeating movement to another repeating movement where the device moves up and down more abruptly, and where the up and down motions are more irregular, may indicate that the device has transitioned to a vehicle transportation mode.

Also, the accelerometer may be used to identify specific gestures that suggest that a user has changed transportation modes. For example, a gesture may be a particular motion of the mobile device over a short period of time (e.g., up to three seconds) that is associated with a particular type of user action. Thus, the mobile device may be able to determine a gesture that corresponds to undocking and placement of the mobile device in a pocket or purse, a gesture that corresponds to a user pulling the mobile device out of a pocket or purse and placing the mobile device in a dock, or a gesture that corresponds to a user sitting down or standing up.

In some examples, the change in transportation mode is determined based at least in part on the device identifying a signal from another device (box 1826). For example, a vehicle may transmit to a mobile device data that identifies the characteristics of the vehicle (e.g., a wireless transmission of data that indicates whether the vehicle is parked, in reverse, or in drive). In another example, the mobile device is able to detect a wireless signal that locks or unlocks a vehicle. In another example, the mobile device is able to detect connection of a pedometer. Such signals may be used to aid a determination of a transportation mode of the mobile computing device.

In some examples, the change in transportation mode is determined based at least in part on the device identifying a signal from an application program (box 1828). For example, the device may determine that a user has provided to a mapping application program user input that requests walking directions, where the device may previously have been displaying driving directions. In another example, the user may have marked a vehicle parking spot as either available or unavailable using an application program that that crowd sources identifications of available parking spots. In yet another example, the user may lock or unlock a vehicle using an application program. Such signals may be used to aid a determination of a transportation mode of the mobile computing device.

In box 1830, the location at the determined change in transportation mode is stored. For example, the mobile device or a server system may store a geographical location of the mobile device, within no more than two minutes—and preferably under ten seconds—of the mobile device undocking (see box 1804). In some examples, the stored location is the location identified by the operations discussed with reference to box 1810. In various examples, the mobile device or server system may be configured to store a single location, and upon receipt of a subsequent location that has been determined to represent a transportation mode change, may overwrite the value that is stored in the single location. In various examples, the mobile device stores multiple locations.

In box 1835, the user is prompted regarding the stored location. For example, upon the mobile device determining that the transportation mode has been changed, a dialog box may appear on the mobile device. The dialog box may state "Record Location?" and include a selectable "Yes" interface element, and a selectable "No" interface element. The dialog box may also include a text box that the user may select in order to enter a comment, for example, "Row 6, near the light pole." Because the change in transportation mode may not necessarily occur immediately upon the user changing his mode of transportation, the prompt may appear with a display of a map and a graphical indication of the determination location of mode transition. In some examples, the user can change the location of the mode transition, for example, by selecting a different location on the displayed map.

In box 1840, an indication that the determined location is to be displayed is received. As an example, the user may finish shopping and forget where the user parked his car. The user may pull out his mobile device and provide user input to launch a "car finding" application program. In another example, the user may have spent the afternoon exploring New York City, all the while jumping on and off of various subways. The user may now be lost and need to determine how to get home. The user may pull out his mobile device and provide user input to launch a "maps" application program. A map of New York City may appear. The map may display the user's route by default and identifications of locations at which a transition between transportation modes occurred.

In box 1842, the mobile computing device displays the one or more locations that were stored with reference to box 1830. For example, a "car finding" application program may display a screen that includes a dot that represents a location of the mobile device. The dot may appear accurately placed with regard to a directional bearing or orientation of the mobile device (box 1848). For example, as the user turns the mobile device, the dot may move side to side on the mobile device. As the user walks in the direction of the car, the dot may move closer to a bottom of the screen (where the bottom of the screen may represent a user's present location). Thus, the "car finding" application may mimic a "sonar" system that shows a bearing of and a distance to a target.

In some examples, the dot may appear for display on a map at a location that corresponds to the stored location. The map may also include a display of the user's present location (box 1844), and may also display a recent route of the mobile computing device (box 1846). In various examples, the route may extend from the user's current location back through the location of the change in transportation mode, and beyond (e.g., until the route leaves the present map display or reaches a predetermined temporal age or distance).

In some examples, the route may only extend for a predetermined distance or time beyond and in front of the location of the change in transportation mode. Thus, the route may provide a user with context as to what direction the user was traveling when the user arrived at the purported change in transportation mode and what direction the user was travelling when the user left the purported change in transportation mode. The limited display of the route, however, may not display a most recent portion of the route as to not distract the user from the location at the change in transportation mode.

As described with reference to FIG. 16, the user interface element at the location of the change in transportation mode may be different than interface elements that identify other historical locations of the mobile computing device, or may be an only user interface element on the line. In some examples, the route line or markers change type at the location of the change in transportation mode. For example, the line may be narrower, a different color, or a different style after the transportation mode change than before the transportation mode change.

In various examples, multiple user interface elements identifying multiple changes in transportation mode along a route may be displayed. In some examples, the display may be filtered to display portions of the route that are specific to a particular type of transportation mode. For example, a user may view a map of the city of New York and filter the display to show subway rides over the last 30 days. Even if the user does not filter the display, the subway rides may appear a different color or style than walking routes, which may appear a different style than driving routes.

In various examples, the user interface element at the location of the change in transportation mode may be an only user interface element of a particular style along a route. Thus, the user interface element may specifically denote a unique event along a route, as opposed to a changing display of data (e.g., speed) for every data point along the route, or for regularly occurring data points along a route. If the route includes multiple unique events, the user interface elements may occur at non-regular periodic intervals along a route, where the occurrence of the interface elements may be determined based on a probabilistically determined change in transportation mode.

In various examples, a method of marking a parking location may include sensing with a mobile computing device, an undocking event for the mobile computing device. The method may include automatically determining a current geographic location for the mobile computing device in response to sensing the undocking event. The method may include registering the current geographic location in memory on the mobile computing device. The method may include displaying to a user, at a later time, the stored geographic location to assist the user in finding the geographic location.

In various examples, the described mechanisms are performed by a mobile computing device and a server system. For example, the mobile computing device may determine periodic geographical locations of the mobile device and transmit the locations and corresponding times to a server system. The server system may perform the determination of whether a transportation mode may change and transmit back data for generating a display that is described with reference to box 1840.

Delaying Execution of Operations

FIG. 19 shows a user interface for delaying execution of a computer process. Mobile computing devices may operate from a rechargeable battery source, which may be treated as a precious resource because exhaustion of power from the battery source may leave the mobile device inoperable until a user plugs the device into an external power source. Thus, there are various mechanisms to extend the battery life of a mobile device. Some mechanisms include limiting the execution of computer processes that are performed by application programs, as the processes can use battery power by their computational operation, and may invoke the use of power-intensive radios for wireless transmission of information.

Accordingly, a mobile computing device may limit the execution of some processes until the mobile computing device is connected to an external power source. Then the mobile device may use the external power to operate the mobile device, or may user the external power to replenish battery power that is used. Some processes may automatically defer their operation until the mobile computing device has been connected to external power. Other processes, however, may require a user prompt.

In FIG. 19, the mobile computing device is displaying a desktop user interface, over a portion of which a process control user interface 1904 is displayed. The process control interface 1904 allows a user to delay execution of one or more executing processes, for example, until the mobile computing device has been docked. In this illustration, the process performs a download of the application program "Great Crosswords."

The process control interface 1904 shows that thirty-five minutes remain in the download of the application program, that one hour and ten minutes remain in battery life if the process continues to download the application program, and that two hours and fifteen minutes would remain if the user delayed execution of the process.

A user may select the "Delay Until Device Docked" user interface element 1906 to delay the download of the application program. Accordingly, upon selection, the download of the "Great Crosswords" application program may be suspended until after the user places the mobile computing device in a dock. As described in more detail later, the download may not commence immediately upon docking. Instead, the mobile computing device may have performed an estimate of the battery power that would be required to finish the download, and may wait until the battery has been charged to this level.

The process control interface 1904 may be adapted to provide information on multiple processes that may be executing on the mobile computing device, however, the single download is presented for clarity. In various examples, the process control interface 1904 may be displayed upon user selection of the "Suspend Processes" user interface element 1908, which may persistently display in the top of the display whenever a process has been determined to be available for delayed execution, regardless of the application program that has device focus.

In some examples, the process control interface 1904 only displays those processes that a user of the mobile device may delay. As described in more detail later, certain processes may register themselves as processes for which execution may be suspended and resumed. For example, the process may register as a type of process (e.g., the process may register as a "synching" operation), or the process may explicitly identify itself as a process that may be suspended. The registration may occur upon installation of an application program that launches the process. In some examples, the mobile device may add a process to the process control interface 1904 when the mobile device determines that the process has been operating without user input for a determined amount of time (e.g., 30 minutes), and where another determined amount of time remains until completion of the process.

In any event, upon determination that a process may be temporarily suspended, the user interface element 1908 may animate or the process control interface 1904 may drop down from the top of the display, effectively prompting the user that one or more processes may be suspended. In some examples, a user is prompted when a battery level drops below a threshold level, when an estimated time of battery life drops below a threshold level, or when a rate of battery use exceeds a threshold level.

FIG. 20 shows a user interface for delaying execution of a computer process. In this example, the mobile device is presenting a user interface 2002 that shows information on a third party application program, and that allows the user to download the third party application program to the mobile computing device. Accordingly, a user may cause the mobile device to download the "Cool Cross Words!" application program by selecting the install user interface element 2004. In various examples, the user may select the install interface element 2004 by tapping on the element, or by using physical mobile device buttons to select the element (e.g., moving a cursor over the element, or using arrow keys to provide focus to the element and then selecting an "enter" button). Such a user input may be referenced as a "primary" user input action.

In this illustration, a user has pressed his finger to the install interface element 2004 and held his finger there until a dialog box 2006 appears. The user moves his finger to the dialog box 2006 and selects the dialog box 2006. In a first example, the dialog box is selected by sliding a finger across the display without removing the finger from the display, and then removing the finger from the display when the dialog box 2006 has been selected. In a second example, the user may release his finger from the display and the dialog box 2006 may remain, allowing the user to tap the dialog box 2006. In various examples, the secondary user input displays a menu from which the "Delay Execution" text appears as one of many selectable choices.

The long press may be referred to as a "secondary" user input action. A secondary user input may also be performed, for example, by tapping on an interface element with two fingers, by sliding a finger across a user interface element, or by selecting a user interface element in combination with a physical button or another user interface element. The primary user input may likewise take many various forms. Accordingly, a single user interface element may provide for multiple mechanisms to select the user interface element.

In any event, selection of the "Delay Execution" dialog box 2006 may cause the dialog box 2008 to appear for display. The dialog box 2008 may allow a user to either confirm or cancel that he wants to delay execution of the command associated with the selected user interface element.

The confirmation that execution of the command should be delayed may cause the mobile computing device to store an indication of the user interface element that was selected (or the command that is associated with the interface element). The mobile computing device may also store an indication of the state of the application program or mobile computing device upon selection of the user interface element, which may assist the mobile device in performing the process that the user intended that the device perform upon selection of the user interface element 2004.

In the present illustration, the mobile device may store an indication that the "Application Store" application program was running, that the user was viewing the "Cool Cross Words!" page, and that the user selected the "Install" button. Accordingly, upon the user plugging the mobile device into external power, the device may be able to launch the application program, navigate to the page, and select the user interface element.

In various examples, the dialog box 2008 appears upon the secondary user input without display of the "Delay Execution" dialog box 2006. In various examples, the execution of the command is delayed immediately upon selection of the "Delay Execution" dialog box 2006, without the display of the additional prompt 2008.

Figure 21B:
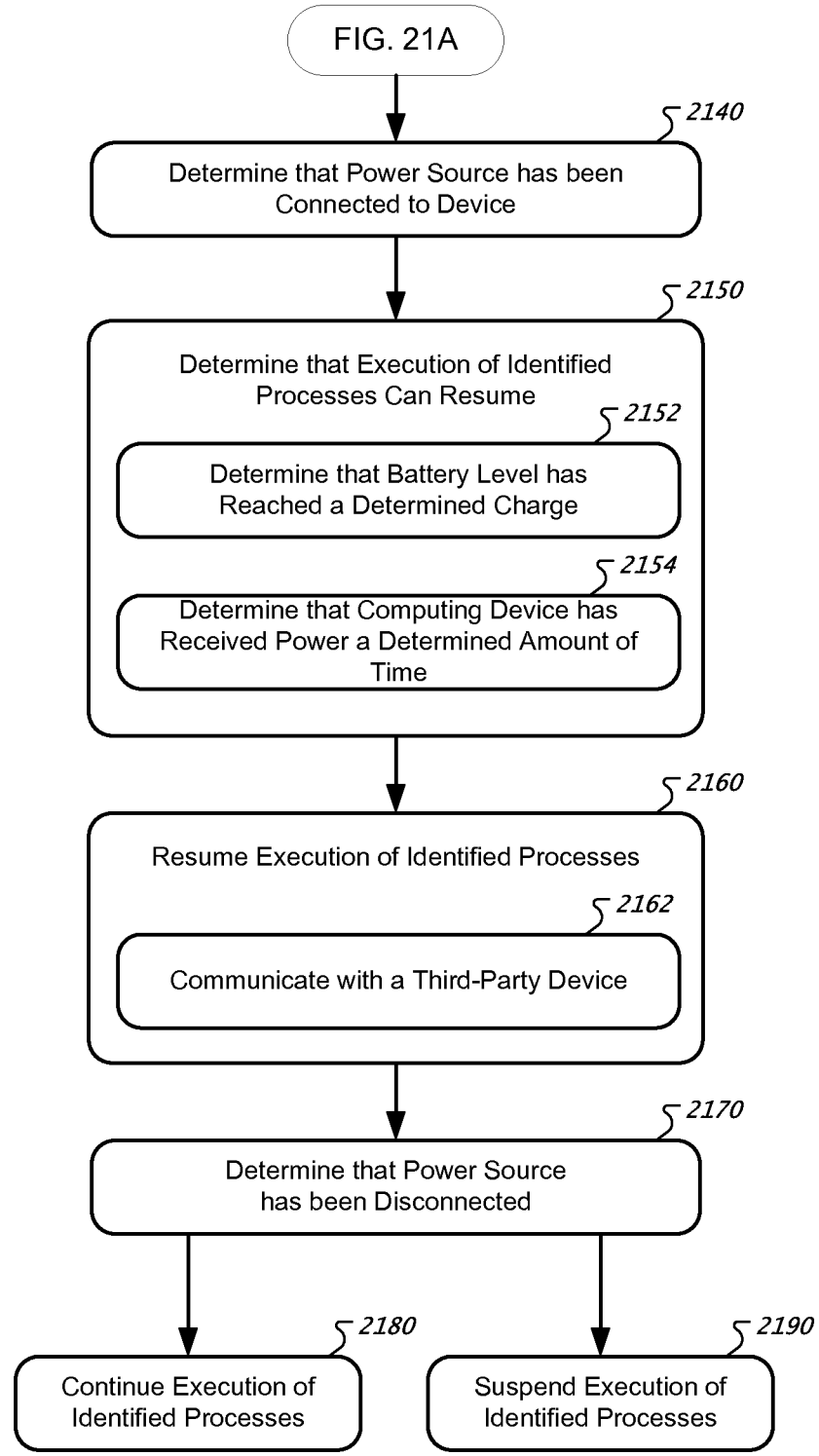

FIGS. 21A-B show a flowchart of an example process for delaying execution of computer processes. In box 2102, the mobile computing device identifies a process for which execution should be delayed (also referred to herein as suspension of the process). Although the mobile device may identify more than one process, this document references an identification of a single process for purposes of simplicity. As described below, the process identification may be initiated by a user (box 2104), by the process itself (box 2106), or by an external procedure (box 2108).

In box 2104, a user initiates identification of a process for delayed execution, for example, by providing user input that causes the mobile device to suspend execution of the process. Without the user input, the process may not suspend at all, or may not suspend for a substantial period of time (e.g., at least five minutes).

In box 2110, the user provides secondary user-input selection of an interface element, for example, as described with reference to FIG. 20. In this manner, a user may identify a command that is associated with selection of a specific user interface element as a command that the user would like the mobile device to perform, but at a different time. In such examples, a mobile device may not need to have extensive mechanisms for recognizing when to suspend processes and how to suspend processes that are already executing. Rather, the mobile computing device may, at some later point in time, execute the command by recovering the state of an application program and executing the command that is associated with the primary user input for the user interface element.

In box 2112, the user selects the process from a list of processes. In some examples, the list of processes includes only those processes that can be suspended. Thus, the mobile device may have previously determined which processes can be suspended (e.g., as described with reference to box 2106).

The list of processes may include only active processes, or may further include processes that are not currently executing but that may execute on the mobile device. For active processes, the user may provide user input to immediately suspend an active process, for example, as illustrated with respect to FIG. 19. For non-active processes, the user may configure settings so that a non-active process is flagged for suspension, either immediately upon execution when undocked or when predefined criteria are met.

In box 2106, an application program identifies processes for delayed execution. For example, upon installation of an application program, the application program may identify itself or component processes as available for delayed execution, or may identify itself or component processes as of a type that the mobile computing device recognizes as available for delayed execution.

In box 2114, the application program identifies a process as available for delayed execution. For example, a voice memo application program may explicitly register an "upload voice memos to server" process as a particular process that may be suspended. Thus, when the voice memo application program requests that the voice memos be uploaded, the mobile device may automatically queue the process for delayed execution (or may prompt the user whether the process should be queued or executed immediately).

In box 2116, the application program identifies a process as of a type that is available for delayed execution. For example, an application program may register a process as a "synching" set of operations. The application program may not explicitly have requested that the particular syncing operation be delayed. The application program, however, may utilize common libraries of executable code to perform the synching operation and thus the mobile computing device may be able to suspend any processes that have been registered by various application programs as synching processes.

In various examples, the processes that have been identified as available are presented to a user in a list for user configuration, for example, as discussed with reference to box 2112.

In box 2108, an external procedure initiates an identification of an executing process that should be delayed. The external procedure may monitor processes that are currently executing on the mobile computing device, and decide that a particular process should be suspended based on the particular process meeting specific criteria.

In box 2118, a process is suspended based on time criteria. In a first example, a process that has been executing for a threshold period of time (e.g., five minutes, ten minutes, or thirty minutes) may be identified for suspension. In a second example, a process that requires an excessive amount of time until completion (e.g., an amount of time that exceeds a threshold value) may be identified for suspension.

In box 2120, a process is suspended based on battery consumption. In a first example, a mobile device is able to estimate an amount of battery power that has been consumed by a process, and may suspend the process if the amount of battery power exceeds a threshold value. In a second example, an estimate of the amount of battery power that will be required is performed, and if the process will require an excessive amount of battery power (e.g., an amount that exceeds a threshold value), the process may be identified for suspension.

In box 2122, a process is suspended based on a quantity of data transfer. In a first example, a mobile device may suspend a process if the amount of wireless data transferred for the process exceeds a threshold value. In a second example, an estimate of the amount of wireless data transfer that may be required to complete the process is performed, and if the process will require an excessive amount of wireless data transfer (e.g., an amount that exceeds a threshold value), the process may be identified for suspension.

In various examples, the criteria of boxes 2118, 2120, and 2122 include an amount of time, battery consumption or data transfer that occurs without receiving any user input events during the amount of time, battery consumption or data transfer. Thus, a process may be identified for suspension if the process has remained idle without user interaction with the process. Thus, a user may not be affected so much if the process is suspended. A user input event may be an event that is caused by the user and that changes a sequence of process operations, where the change in sequence may not otherwise occur without the user input.

In box 2130, execution of the identified process is delayed. In some examples, the mobile computing device sends to the process (or to the application program that is hosting the process) a command that requests that the process suspend operation. In some examples, the mobile computing device forcibly halts execution of the process without notifying the process. In some examples, the mobile computing device stores a state of the process prior to suspension.

In box 2140, the mobile computing device determines that a power source has been connected to the mobile device. For example, the mobile device may determine that the device has been placed in a dock, as described throughout this document.

In box 2150, the mobile computing device determines that execution of the identified processes (which were delayed at box 2130) may resume. In various examples, the resumption of the identified processes may occur substantially immediately upon determining that a power source has been connected to the device (e.g., within thirty seconds). In other examples, the mobile device may first determine either that the battery level has reached a determined charge (box 2152), or that the computing device has received power a determined amount of time (box 2154). In some examples, the user provides user input to resume execution of the processes, even though the mobile device has not been docked.

In box 2152, the mobile device determines that a battery level has reached a determined charge. In a first example, the mobile device may determine that the battery level has reached a predetermined threshold (e.g., 20% of battery capacity). In some examples, the mobile device is available for use prior to the device reaching the threshold. Thus, a user may use the mobile device to make telephone calls while the device is at 10% of battery capacity.

In a second example, the mobile device may determine that the battery level has reached a determined threshold, where a charge at the determined threshold allows the mobile device to complete execution of any processes that have been suspended. Thus, the mobile device may calculate an estimate of battery capacity that is required to complete each process in determining the threshold. If the processes cannot be completed on even a full battery charge, the mobile device may begin execution upon the device reaching a full charge, or substantially a full charge (e.g., within 5% of a full charge).

In a third example, the mobile device may determine that the battery level has reached another determined threshold, where a charge at the other determined threshold allows the mobile device to complete execution of any processes that have been suspended and still have a determined level of remaining battery charge upon completion of the processes.

In box 2160, the mobile device resumes execution of the identified processes. For example, upon the mobile device being connected to a power source for the requisite period of time, the mobile device may launch a state of a process into the state of the process prior to suspension of the process.

In box 2162, execution of the identified process includes communicating with third-party devices. For example, the process which has resumed execution may cause the mobile device to use its wireless radio to exchange data over a cellular network. In some examples, the exchange of data may not involve transmitting data through a device which physically provides power to the mobile device. As an illustration, a docked smartphone may perform a syncing operation using a wireless carrier's network or using a Wi-Fi signal instead of using a physical or wireless data path from the smartphone to the dock.

In box 2170, the mobile computing device determines that the power source has been disconnected. For example, the mobile device may determine that power is no longer being received by the mobile device or that the device has undocked, as described throughout this document.

In box 2180, the mobile computing device continues execution of the identified processes upon power source disconnection. Accordingly, a process that was put on hold previously when the device was not docked may now be allowed to execute when the mobile device is not docked.

In box 2190, the mobile computing device suspends execution of the identified processes in response to determining that the power source was disrupted, for example, as performed in box 2130.

In various examples, a process may be an instance of a computer program that is being executed. The process may include an actual sequential execution of instructions. A process may reserve memory during execution and may store variables in the reserved memory (e.g., memory that is not available to other processes). Suspension of a process may include halting an execution of the instructions, storing a last performed instruction, storing a to-be-next performed instruction, storing any information in reserved memory, and storing any information in data registers.

Although the process that is described with reference to FIGS. 21A-B often discusses actions that are performed by a mobile computing device, such actions may be performed by a server system in cooperation with the mobile device. For example, and with reference to box 2152, a mobile device may take a voltage reading off of the device's battery, and may transmit the voltage reading to a server system for calculation whether the voltage reading corresponds to a battery level that has reached an appropriate charge. The server system may transmit back to the device a response. Such client-server communication to receive an answer may be considered a determination that is performed "by the mobile computing device."

In various examples, a charging device triggers specific actions. Many devices today perform synchronization actions when docked to a computer. Many computers change settings when plugged in (e.g., longer timeout interval on screen's backlight). The idea may be to perform many actions (which could be user configurable) when the device gets plugged in. Examples include (1) generating thumbnails for all images on SD card which is CPU intensive and takes a lot of power, (2) uploading all new pictures to online photo albums because using radio takes power, (3) downloading rich media stored on servers (e.g., pictures, friends pictures, and documents), and (4) switching all non-media and non-voice related application audio to speakerphone for a case where the phone is plugged into car power on the dash for an upcoming navigation application.

In certain situations, the docking may simply involve a recognition that the device has been connected to wired power (e.g., plugged into an electrical outlet). In such a situation, the device may automatically commence performing power-hungry applications, such as transferring large files, updating video podcasts, and the like. The automatic performance of such actions may also occur after a delay after plugging the device in, such as when the device has obtained sufficient charge so that the actions can be completed even if a user unplugs the device from outlet power while the actions are being performed.

In one example operation of the device and dock, a mere arrival of wired power to the device may trigger the performance of certain actions—and specifically actions that are determined to be power-hungry applications, in that they use a lot of electrical power, and thus are actions that might not be advisable when the device is not docked because they would significantly draw down battery power. Those power-hungry actions may include actions such as performing batch file transfers, such as when a user has used their mobile device to record conversations or videos while they're away from a docking station. Such transfers may normally be time-consuming and may consume substantial power when performed over a wireless connection. Similarly, information that is stored in a location other than on the mobile device may be downloaded to the mobile device when the mobile device is docked, either through the physical, or way of a wireless connection that is instigated by the docking of the mobile computing device. Such a transfer may include a transfer of media information, such as podcasts, that have arrived on a user's home computer while the user's mobile computing device was not docked to the home computer.

In certain instances, the device may be programmed to automatically obtain or provide certain information through the dock or with a system that is associated with the dock, in response to being docked. For example, when the dock is in an automobile, the device may obtain information about the current status of the automobile, including the current RPMs of the automobile, the gear in which the automobile is operating, a speed of the automobile, the status of air-conditioning and entertainment systems in the automobile, and other information. In addition, the device may be programmed to operate as a partial or complete head unit for an entertainment system in the automobile (or a screen in the car can act as a head unit for the device).

For example, the automobile may be provided only with amplifiers, speakers, and associated hardware, but not input and output mechanisms. The mobile computing device may serve the role of the input and output mechanisms, and may also provide for encoding and decoding of digital music and other such common operations. In this way, an owner of an automobile may be able to update the interaction of their car stereo by updating software on the mobile computing device, and may customize the way that their entertainment system in their automobile interacts with them. Also as the user acquires newer mobile computing devices, the user's experience with their mobile entertainment system in their automobile may improve.

Moreover, the user may have a preferential experience because the user interface that they face will not be different or substantially different between their interaction when they are at home or walking around, as compared to when they are driving their automobile. The mobile computing device may also act as a supplemental interface for an interface that is part of the automobile. For example, the automobile may provide for radio station selection and other common actions, while the mobile computing device may provide for selection of particular song titles or other media files that are stored on the mobile computing device.

Figure 22:
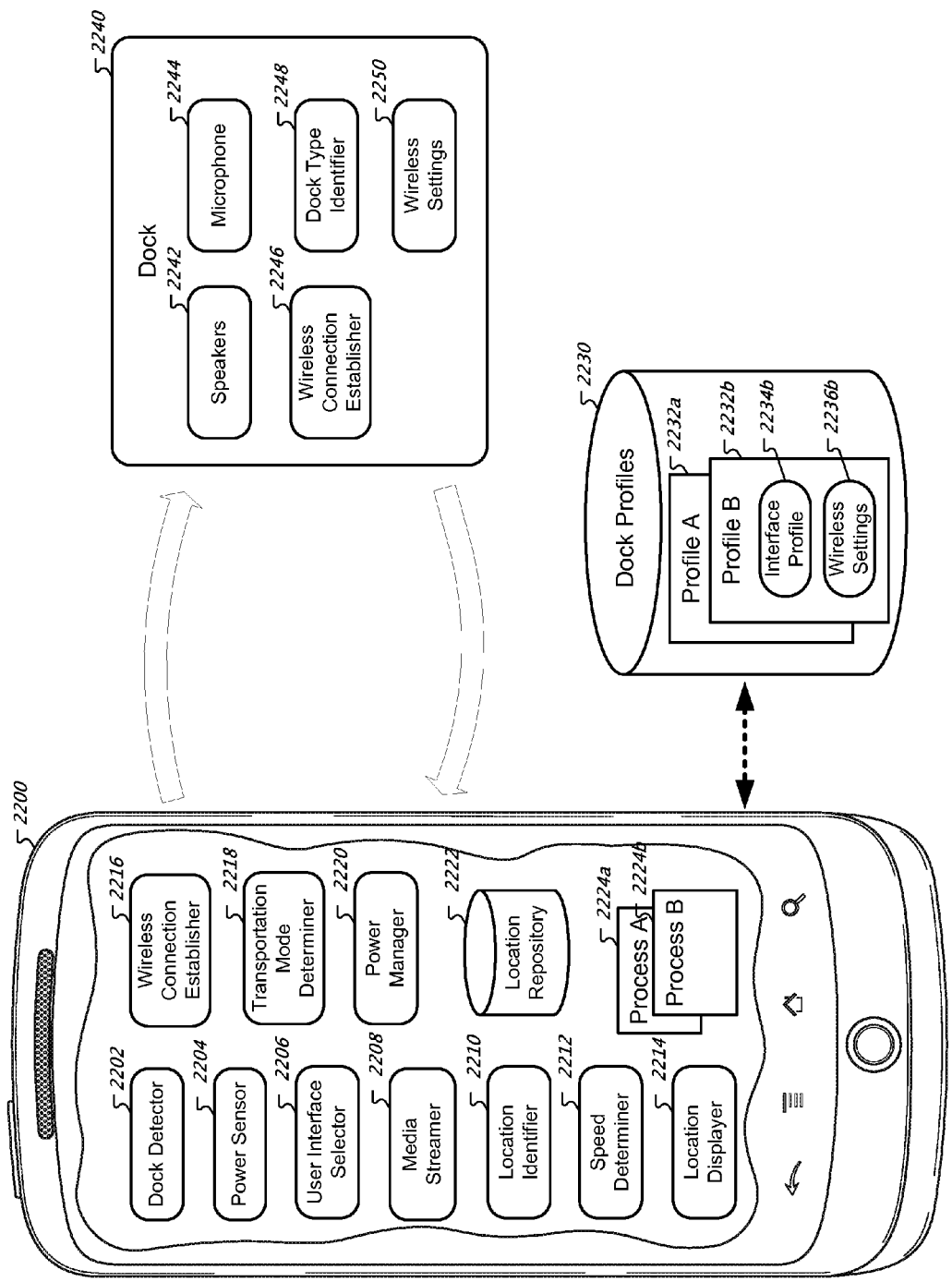
FIG. 22 shows an example system that includes a mobile computing device and a dock.

FIG. 22 shows an example system that includes a mobile computing device and a dock. The mobile computing device 2200 and dock 2240 are examples of the mobile devices and docks that are referenced throughout this document. The mobile computing device 2200 may operate in cooperation with a server system. Thus, although components 2202 through 2224 are illustrated as being part of the mobile device 2200, the components may be at least partially included in a server system that is in communication with the mobile device.

The dock detector 2202 determines that a mobile computing device has physically paired with a dock. For example, the dock detector may determine that the mobile computing device has electrically coupled with a docking system that is adapted to supply electrical power for charging the mobile computing device. The dock detector may determine that the docking system is a first type of docking system from a plurality of types of docking system, for example, by performing at least some of the operations of the mobile computing device in FIG. 7 (e.g., boxes 702 to 714), and by communicating with the dock via conductive pad 606.

The power sensor 2204 may be arranged to detect when the computing device is attached to a power source that is for charging the mobile computing device. In various examples, the dock detector 2202 communicates with the power sensor 2204. In various examples, the power sensor 2204 is unable to distinguish between power that is being supplied through conductive pad 602 and power that is being supplied through the data terminal 610.

The wireless connection establisher 2216 establishes a wireless communication session between the mobile computing device and the docking system in response to the dock detector 2202 determining that the mobile computing device has physically paired with the docking system. Thus, the wireless connection establisher 2216 may perform at least some of the operations of the mobile computing device in FIG. 7 (e.g., boxes 716 to 732). The wireless connection establisher 2216 may use the dock type (as determined by the dock detector 2202) to identify a corresponding profile 2232*b*, and access the wireless settings 2236*b* in the corresponding profile. The wireless settings 2236*b* may specify a previously saved wireless network identifier and authentication code for establishing the wireless connection with the dock. The wireless settings 2236*b* may also specify types of wireless communication to activate between the mobile computing device and dock, for example, whether the dock should act as a speakerphone, and whether the device should audibly output audio that is generated by the mobile device.

The user interface selector 2206 may select a user interface profile for use by the mobile computing device 2200 in response to the dock type detector 2202 determining that the mobile computing device has electrically coupled with the docking system and determining the type of docking system. For example, the user interface selector 2206 may receive from the dock detector 2202 a type of dock. The user interface selector 2206 may then use the type of dock to access a corresponding profile from the repository of dock profiles 2230. The corresponding profile may include settings for generating a unique graphical scheme for the user, for example, as referenced with respect to FIGS. 8-11.

The media streamer 2208 may wirelessly transmit, from the mobile computing device to the docking system, data that encodes an audio signal so as to cause speakers of the docking system to audibly output the audio signal.

The location identifier 2210 may determine a geographical location of the mobile computing device, for example using Wi-Fi router identification, cell-tower triangulation, or satellite-based positioning systems. Thus, the location identifier 2210 may determine a plurality of geographical locations of mobile computing device at a plurality of respective times. The mobile device may store the geographical locations and the respective times in the location repository 2222.

The speed determiner 2212 may determine a plurality of speeds of the mobile computing device based on the plurality of geographical locations and the plurality of respective times, for example, as described with respect to FIGS. 16-18.

The transportation mode determiner 2218 may determine a particular geographical location at which the mobile computing device switched from a first transportation mode to a second transportation mode. The switch in transportation mode may be determined based on a change in speed of the mobile computing device or, for example, as described with respect to FIGS. 16-18.

The location displayer 2214 may display a visual indication of the particular geographical location, for example, as shown in and described with respect to FIG. 16.

Multiple power-intensive processes 2224*a* and 2224*b* may perform operations that have been identified as excessive drains on battery levels for the mobile device. Each process may be launched by an application program and may be terminated by an application program.

The power manager 2220 may withhold execution of operations of one or more processes while the mobile device is not connected to the power source, and trigger execution of the operations automatically in response to sensing with the power sensor 2204 that the device has been connected to the power source. The power manager may identify the processes, for example as described with respect to box 2102 (FIG. 21A).

The dock 2240 may include speakers 2242 and a microphone 2244, as described throughout this document. The dock 2240 may also include a wireless connection establisher 2246 to establish a wireless connection with a mobile computing device which has docked in the mobile device, for example, by performing the operations of boxes 710 through 730 in FIG. 7. The wireless connection establisher 2246 may send the dock type identifier 2248 to the mobile device 2200, to enable the dock detector 2202 to determine the type of dock that the mobile device has mated with. The dock 2240 may also store wireless settings 2250 that are particular to the mobile device 2200. The wireless settings 2250 may include a wireless network identifier and authentication code that enables the dock 2240 to establish a wireless connection with the mobile device 2200 (after an initial pairing) without exchanging an address and pin code.

Figure 23:
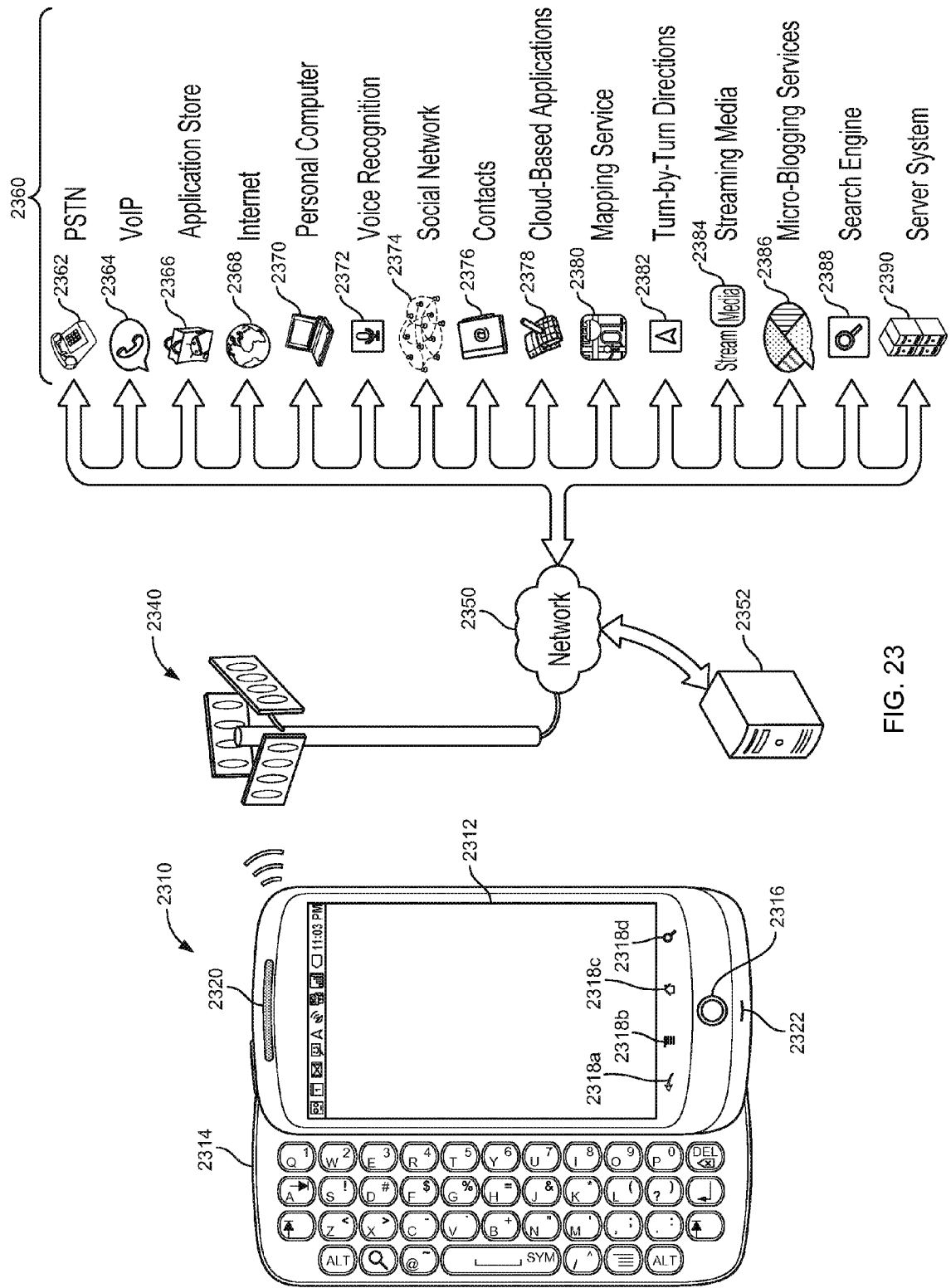
FIG. 23 is a conceptual diagram of a system that may be used to implement the systems and methods described in this document.

Referring now to FIG. 23, a conceptual diagram of a system that may be used to implement the systems and methods described in this document is illustrated. In the system, mobile computing device 2310 can wirelessly communicate with base station 2340, which can provide the mobile computing device wireless access to numerous hosted services 2360 through a network 2350.

In this illustration, the mobile computing device 2310 is depicted as a handheld mobile telephone (e.g., a smartphone, or application telephone) that includes a touchscreen display device 2312 for presenting content to a user of the mobile computing device 2310 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 2314, physical buttons, trackballs, accelerometers, gyroscopes, and magnetometers).

Example visual output mechanism in the form of display device 2312 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 2310. The mobile computing device 2310 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 2314, which may be a full qwerty keyboard or a traditional keypad that includes keys for the digits '0-9', '*', and '#.' The keyboard 2314 receives input when a user physically contacts or depresses a keyboard key. User manipulation of a trackball 2316 or interaction with a trackpad enables the user to supply directional and rate of rotation information to the mobile computing device 2310 (e.g., to manipulate a position of a cursor on the display device 2312).

The mobile computing device 2310 may be able to determine a position of physical contact with the touchscreen display device 2312 (e.g., a position of contact by a finger or a stylus). Using the touchscreen 2312, various "virtual" input mechanisms may be produced, where a user interacts with a graphical user interface element depicted on the touchscreen 2312 by contacting the graphical user interface element. An example of a "virtual" input mechanism is a "software keyboard," where a keyboard is displayed on the touchscreen and a user selects keys by pressing a region of the touchscreen 2312 that corresponds to each key.

The mobile computing device 2310 may include mechanical or touch sensitive buttons 2318a-d. Additionally, the mobile computing device may include buttons for adjusting volume output by the one or more speakers 2320, and a button for turning the mobile computing device on or off. A microphone 2322 allows the mobile computing device 2310 to convert audible sounds into an electrical signal that may be digitally encoded and stored in computer-readable memory, or transmitted to another computing device. The mobile computing device 2310 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 2310 may present a graphical user interface with the touchscreen 2312. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 2304. User-selection of the button may invoke the pre-defined action.

In some examples, the operating system provides a "desktop" user interface that is displayed upon turning on the mobile computing device 2310, activating the mobile computing device 2310 from a sleep state, upon "unlocking" the mobile computing device 2310, or upon receiving user-selection of the "home" button 2318c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 2310 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 2312 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 2310 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 2310 may include other application modules and hardware. A call handling unit may receive an indication of an incoming telephone call and provide to a user capabilities to answer the incoming telephone call. A media player may allow a user to listen to music or play movies that are stored in local memory of the mobile computing device 2310. The mobile telephone 2310 may include a digital camera sensor, and corresponding image and video capture and editing software. An internet browser may enable the user to view content from a web page by typing in an addresses corresponding to the web page or selecting a link to the web page.

The mobile computing device 2310 may include an antenna to wirelessly communicate information with the base station 2340. The base station 2340 may be one of many base stations in a collection of base stations (e.g., a mobile telephone cellular network) that enables the mobile computing device 2310 to maintain communication with a network 2350 as the mobile computing device is geographically moved. The computing device 2310 may alternatively or additionally communicate with the network 2350 through a Wi-Fi router or a wired connection (e.g., Ethernet, USB, or FIREWIRE). The computing device 2310 may also wirelessly communicate with other computing devices using BLUETOOTH protocols, or may employ an ad-hoc wireless network.

A service provider that operates the network of base stations may connect the mobile computing device 2310 to the network 2350 to enable communication between the mobile computing device 2310 and other computerized devices that provide services 2360. Although the services 2360 may be provided over different networks (e.g., the service provider's internal network, the Public Switched Telephone Network, and the Internet), network 2350 is illustrated as a single network. The service provider may operate a server system 2352 that routes information packets and voice data between the mobile computing device 2310 and computing devices associated with the services 2360.

The network 2350 may connect the mobile computing device 2310 to the Public Switched Telephone Network (PSTN) 2362 in order to establish voice or fax communication between the mobile computing device 2310 and another computing device. For example, the service provider server system 2352 may receive an indication from the PSTN 2362 of an incoming call for the mobile computing device 2310. Conversely, the mobile computing device 2310 may send a communication to the service provider server system 2352 initiating a telephone call with a telephone number that is associated with a device accessible through the PSTN 2362.

The network 2350 may connect the mobile computing device 2310 with a Voice over Internet Protocol (VoIP) service 2364 that routes voice communications over an IP network, as opposed to the PSTN. For example, a user of the mobile computing device 2310 may invoke a VoIP application and initiate a call using the program. The service provider server system 2352 may forward voice data from the call to a VoIP service, which may route the call over the internet to a corresponding computing device, potentially using the PSTN for a final leg of the connection.

An application store 2366 may provide a user of the mobile computing device 2310 the ability to browse a list of remotely stored application programs that the user may download over the network 2350 and install on the mobile computing device 2310. The application store 2366 may serve as a repository of applications developed by third-party application developers. An application program that is installed on the mobile computing device 2310 may be able to communicate over the network 2350 with server systems that are designated for the application program. For example, a VoIP application program may be downloaded from the Application Store 2366, enabling the user to communicate with the VoIP service 2364.

The mobile computing device 2310 may access content on the internet 2368 through network 2350. For example, a user of the mobile computing device 2310 may invoke a web browser application that requests data from remote computing devices that are accessible at designated universal resource locations. In various examples, some of the services 2360 are accessible over the internet.

The mobile computing device may communicate with a personal computer 2370. For example, the personal computer 2370 may be the home computer for a user of the mobile computing device 2310. Thus, the user may be able to stream media from his personal computer 2370. The user may also view the file structure of his personal computer 2370, and transmit selected documents between the computerized devices.

A voice recognition service 2372 may receive voice communication data recorded with the mobile computing device's microphone 2322, and translate the voice communication into corresponding textual data. In some examples, the translated text is provided to a search engine as a web query, and responsive search engine search results are transmitted to the mobile computing device 2310.

The mobile computing device 2310 may communicate with a social network 2374. The social network may include numerous members, some of which have agreed to be related as acquaintances. Application programs on the mobile computing device 2310 may access the social network 2374 to retrieve information based on the acquaintances of the user of the mobile computing device. For example, an "address book" application program may retrieve telephone numbers for the user's acquaintances. In various examples, content may be delivered to the mobile computing device 2310 based on social network distances from the user to other members. For example, advertisement and news article content may be selected for the user based on a level of interaction with such content by members that are "close" to the user (e.g., members that are "friends" or "friends of friends").

The mobile computing device 2310 may access a personal set of contacts 2376 through network 2350. Each contact may identify an individual and include information about that individual (e.g., a phone number, an email address, and a birthday). Because the set of contacts is hosted remotely to the mobile computing device 2310, the user may access and maintain the contacts 2376 across several devices as a common set of contacts.

The mobile computing device 2310 may access cloud-based application programs 2378. Cloud-computing provides application programs (e.g., a word processor or an email program) that are hosted remotely from the mobile computing device 2310, and may be accessed by the device 2310 using a web browser or a dedicated program. Example cloud-based application programs include GOOGLE DOCS word processor and spreadsheet service, GOOGLE GMAIL webmail service, and PICASA picture manager.

Mapping service 2380 can provide the mobile computing device 2310 with street maps, route planning information, and satellite images. An example mapping service is GOOGLE MAPS. The mapping service 2380 may also receive queries and return location-specific results. For example, the mobile computing device 2310 may send an estimated location of the mobile computing device and a user-entered query for "pizza places" to the mapping service 2380. The mapping service 2380 may return a street map with "markers" superimposed on the map that identify geographical locations of nearby "pizza places."

Turn-by-turn service 2382 may provide the mobile computing device 2310 with turn-by-turn directions to a user-supplied destination. For example, the turn-by-turn service 2382 may stream to device 2310 a street-level view of an estimated location of the device, along with data for providing audio commands and superimposing arrows that direct a user of the device 2310 to the destination.

Various forms of streaming media 2384 may be requested by the mobile computing device 2310. For example, computing device 2310 may request a stream for a pre-recorded video file, a live television program, or a live radio program. Example services that provide streaming media include YOUTUBE and PANDORA.

A micro-blogging service 2386 may receive from the mobile computing device 2310 a user-input post that does not identify recipients of the post. The micro-blogging service 2386 may disseminate the post to other members of the micro-blogging service 2386 that agreed to subscribe to the user.

A search engine 2388 may receive user-entered textual or verbal queries from the mobile computing device 2310, determine a set of internet-accessible documents that are responsive to the query, and provide to the device 2310 information to display a list of search results for the responsive documents. In examples where a verbal query is received, the voice recognition service 2372 may translate the received audio into a textual query that is sent to the search engine.

These and other services may be implemented in a server system 2390. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 24:
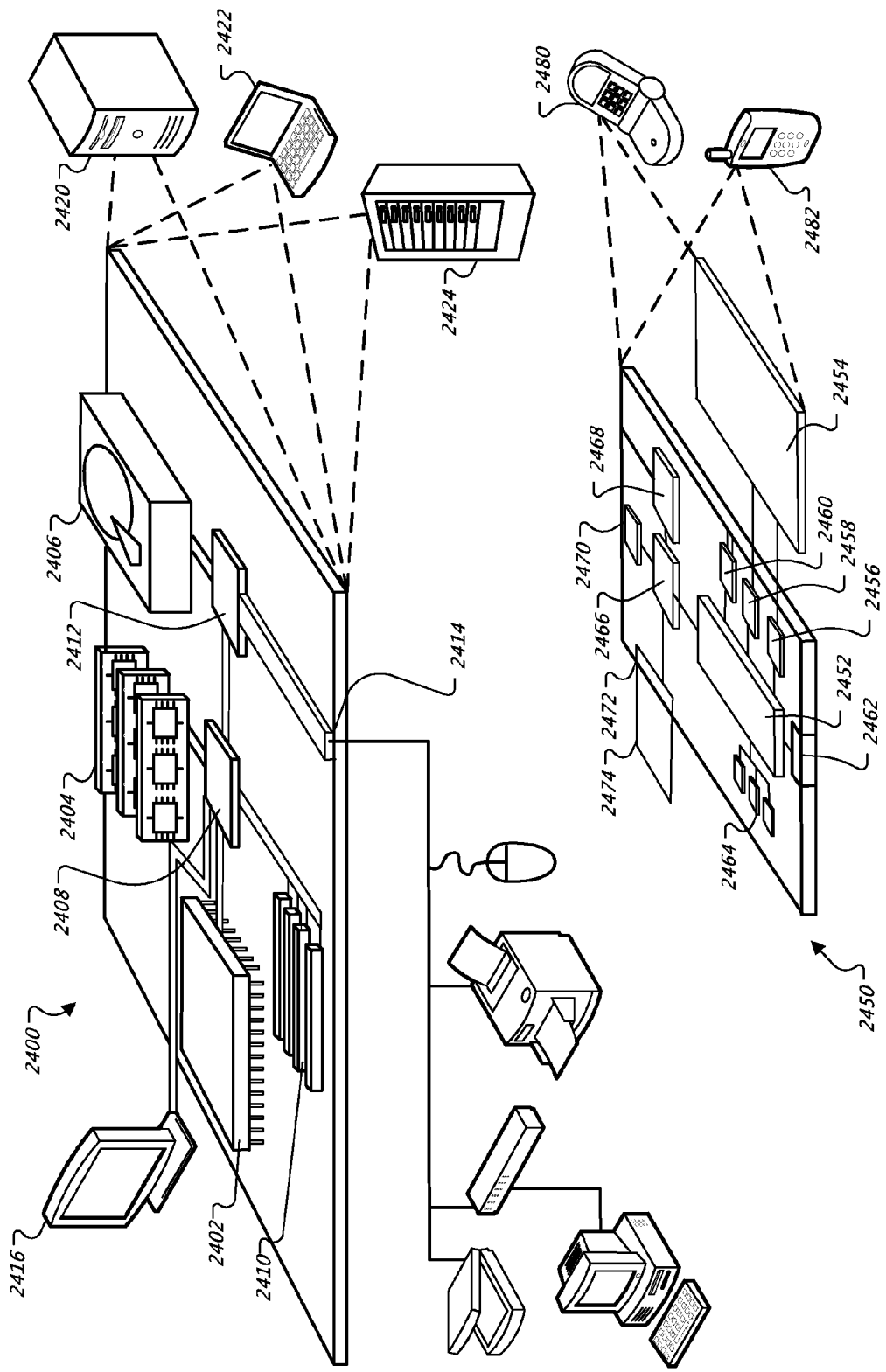
FIG. 24 is a block diagram of computing devices that may be used to implement the systems and methods described in this document, as either a client or as a server or plurality of servers.

FIG. 24 is a block diagram of computing devices 2400, 2450 that may be used to implement the systems and methods described in this document, as either a client or as a server or plurality of servers. Computing device 2400 is intended to represent various forms of digital computers, such as laptops, desktops, workstations, personal digital assistants, servers, blade servers, mainframes, and other appropriate computers. Computing device 2450 is intended to represent various forms of mobile devices, such as personal digital assistants, cellular telephones, smartphones, and other similar computing devices. Additionally computing device 2400 or 2450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 2400 includes a processor 2402, memory 2404, a storage device 2406, a high-speed interface 2408 connecting to memory 2404 and high-speed expansion ports 2410, and a low speed interface 2412 connecting to low speed bus 2414 and storage device 2406. Each of the components 2402, 2404, 2406, 2408, 2410, and 2412, are interconnected using various busses, and may be mounted on a common motherboard or in other manners as appropriate. The processor 2402 can process instructions for execution within the computing device 2400, including instructions stored in the memory 2404 or on the storage device 2406 to display graphical information for a GUI on an external input/output device, such as display 2416 coupled to high speed interface 2408. In other implementations, multiple processors and/or multiple buses may be used, as appropriate, along with multiple memories and types of memory. Also, multiple computing devices 2400 may be connected, with each device providing portions of the necessary operations (e.g., as a server bank, a group of blade servers, or a multi-processor system).

The memory 2404 stores information within the computing device 2400. In one implementation, the memory 2404 is a volatile memory unit or units. In another implementation, the memory 2404 is a non-volatile memory unit or units. The memory 2404 may also be another form of computer-readable medium, such as a magnetic or optical disk.

The storage device 2406 is capable of providing mass storage for the computing device 2400. In one implementation, the storage device 2406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2404, the storage device 2406, or memory on processor 2402.

The high speed controller 2408 manages bandwidth-intensive operations for the computing device 2400, while the low speed controller 2412 manages lower bandwidth-intensive operations. Such allocation of functions is exemplary only. In one implementation, the high-speed controller 2408 is coupled to memory 2404, display 2416 (e.g., through a graphics processor or accelerator), and to high-speed expansion ports 2410, which may accept various expansion cards (not shown). In the implementation, low-speed controller 2412 is coupled to storage device 2406 and low-speed expansion port 2414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2400 may be implemented in a number of different forms, as shown in the figure. For example, it may be implemented as a standard server 2420, or multiple times in a group of such servers. It may also be implemented as part of a rack server system 2424. In addition, it may be implemented in a personal computer such as a laptop computer 2422. Alternatively, components from computing device 2400 may be combined with other components in a mobile device (not shown), such as device 2450. Each of such devices may contain one or more of computing device 2400, 2450, and an entire system may be made up of multiple computing devices 2400, 2450 communicating with each other.

Computing device 2450 includes a processor 2452, memory 2464, an input/output device such as a display 2454, a communication interface 2466, and a transceiver 2468, among other components. The device 2450 may also be provided with a storage device, such as a microdrive or other device, to provide additional storage. Each of the components 2450, 2452, 2464, 2454, 2466, and 2468, are interconnected using various buses, and several of the components may be mounted on a common motherboard or in other manners as appropriate.

The processor 2452 can execute instructions within the computing device 2450, including instructions stored in the memory 2464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 2450, such as control of user interfaces, applications run by device 2450, and wireless communication by device 2450.

Processor 2452 may communicate with a user through control interface 2458 and display interface 2456 coupled to a display 2454. The display 2454 may be, for example, a TFT (Thin-Film-Transistor Liquid Crystal Display) display or an OLED (Organic Light Emitting Diode) display, or other appropriate display technology. The display interface 2456 may comprise appropriate circuitry for driving the display 2454 to present graphical and other information to a user. The control interface 2458 may receive commands from a user and convert them for submission to the processor 2452. In addition, an external interface 2462 may be provide in communication with processor 2452, so as to enable near area communication of device 2450 with other devices. External interface 2462 may provide, for example, for wired communication in some implementations, or for wireless communication in other implementations, and multiple interfaces may also be used.

The memory 2464 stores information within the computing device 2450. The memory 2464 can be implemented as one or more of a computer-readable medium or media, a volatile memory unit or units, or a non-volatile memory unit or units. Expansion memory 2474 may also be provided and connected to device 2450 through expansion interface 2472, which may include, for example, a SIMM (Single In Line Memory Module) card interface. Such expansion memory 2474 may provide extra storage space for device 2450, or may also store applications or other information for device 2450. Specifically, expansion memory 2474 may include instructions to carry out or supplement the processes described above, and may include secure information also. Thus, for example, expansion memory 2474 may be provide as a security module for device 2450, and may be programmed with instructions that permit secure use of device 2450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2464, expansion memory 2474, or memory on processor 2452 that may be received, for example, over transceiver 2468 or external interface 2462.

Device 2450 may communicate wirelessly through communication interface 2466, which may include digital signal processing circuitry where necessary. Communication interface 2466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2468. In addition, short-range communication may occur, such as using a Bluetooth, WiFi, or other such transceiver (not shown). In addition, GPS (Global Positioning System) receiver module 2470 may provide additional navigation- and location-related wireless data to device 2450, which may be used as appropriate by applications running on device 2450.

Device 2450 may also communicate audibly using audio codec 2460, which may receive spoken information from a user and convert it to usable digital information. Audio codec 2460 may likewise generate audible sound for a user, such as through a speaker, e.g., in a handset of device 2450. Such sound may include sound from voice telephone calls, may include recorded sound (e.g., voice messages, music files, etc.) and may also include sound generated by applications operating on device 2450.

The computing device 2450 may be implemented in a number of different forms, as shown in the figure. For example, it may be implemented as a cellular telephone 2480. It may also be implemented as part of a smartphone 2482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
determining that a mobile computing device has electrically coupled by physical contact with a docking system that is adapted to supply electrical power for charging the mobile computing device;
determining that the docking system is a first type of docking system from a plurality of types of docking systems;
selecting a first user interface profile that corresponds to the first type of docking system from among a plurality of user interface profiles, each of the plurality of user interface profiles corresponding to a respective type of docking system from the plurality of types of docking systems;
presenting, by the mobile computing device for display, the first user interface profile in response to selecting the first user interface profile; and
presenting, by the mobile computing device for display, a first configuration user interface as part of the first user interface profile,
wherein the first configuration user interface is a user interface with which a user of the mobile computing device is able to select one or more settings that cause the mobile computing device to (i) transmit to the docking system audio signals that a particular application program on the mobile computing device generates while the mobile computing device is electrically coupled with the docking system, and (ii) mute audio signals that one or more other application programs on the mobile computing device generate while the mobile computing device is electrically coupled with the docking station,
wherein the mobile computing device is configured to audibly output audio signals that the one or more other application programs on the mobile computing device generate while the mobile computing device is not electrically coupled with the docking station.

2. The method of claim 1, wherein determining that the docking system is the first type of docking system includes receiving, via a physical electrical connection between the docking system and the mobile computing device, an electrical signal from the docking system that identifies the docking system as the first type of docking system in distinction to other of the plurality of types of docking systems.

3. The method of claim 2, wherein each of the plurality of types of docking systems receives the electrical signal over a same electrical interface configuration.

4. The method of claim 2, wherein the received electrical signal is a serially transmitted digital signal.

5. The method of claim 1, wherein the first configuration user interface is presented in distinction to other configuration user interfaces that correspond to other of the plurality of user interface profiles.

6. The method of claim 1, wherein the first configuration user interface is an initial user interface that can receive user input that is specific to the first user interface profile upon determining that the mobile computing device has electrically coupled with the docking system.

7. The method of claim 1, wherein presenting the first configuration user interface is performed in response to determining that the mobile computing device has not electrically coupled with the docking system before; the method further comprising:
receiving user input, with the first configuration user interface, for activating wireless communication between the mobile computing device and the docking system; and
storing an indication that wireless communication between the mobile computing device and the docking system is to be activated when the mobile computing device is electrically coupled with the docking system.

8. The method of claim 7, further comprising:
determining that the mobile computing device has electrically coupled with the docking system a subsequent time;
presenting, by the mobile computing device for display, the first user interface profile without presenting the first configuration user interface as part of the first user interface profile; and
establishing wireless communication between the mobile computing device and the docking system based on the stored indication and without receiving user input subsequent to determining that the mobile computing device has electrically coupled with the docking system the subsequent time.

9. The method of claim 8, wherein the stored indication indicates that: (i) the mobile computing device is to transmit to the docking system an audio signal that the mobile computing device receives from another party during a telephone call, and (ii) that the mobile computing device is to receive from the docking system an audio signal that the mobile computing device is to transmit to the other party during the telephone call.

10. The method of claim 8, wherein the particular application program is a media player application program.

11. The method of claim 1, wherein the first user interface profile includes a display of a desktop background display that changes at least in part based on a geographical position of the mobile computing device, wherein a desktop background display is a display that is presented as a backdrop to multiple graphical interface elements that, when selected, each invoke a respective application program from a plurality of application programs.

12. The method of claim 11, wherein each of the plurality of application programs were downloaded to the mobile computing device from an application store that allows users to select, from a collection of application programs that were authored by various third-party entities, application programs to download.

13. The method of claim 11, wherein the desktop background display includes a display of a map that changes, as the geographical position of the mobile device changes, to consistently identify a geographical position of the mobile computing device.

14. The method of claim 13, wherein another user interface profile from the plurality of user interface profiles includes a display of a desktop background display that does not change based at least in part on the geographical position of the mobile computing device.

15. The method of claim 1, wherein the first user interface profile indicates that a default display of information on the mobile computing device is to appear in a landscape display mode when the first user interface profile is presented.

16. The method of claim 15, wherein a second user interface profile from the plurality of user interface profiles indicates that a default display of information on the mobile computing device is to appear in a portrait display mode when the second user interface profile is presented.

17. The method of claim 1, wherein the first user interface profile indicates that a physical button of the mobile computing device is to be deactivated while the mobile computing device is presenting the first user interface profile, and wherein a second user interface profile from the plurality of user interface profiles indicates that the physical button is to be active while the mobile computing device is presenting the second user interface profile.

18. The method of claim 1, wherein the one or more settings of the first configuration user interface include a first setting that causes the docking system to output audio from a telephone conversation and a second setting that causes the docking system to output audio from a media player application program.

19. The method of claim 1, wherein the one or more settings of the first configuration user interface enables the user to activate use of the docking system to audibly output a telephone ringer and alarm audio, but silences at least some other audio events that would otherwise be audibly output by the telephone if the telephone were not electrically coupled with the docking system.

20. One or more computer-readable storage devices storing instructions that, when executed by one or more processing devices, perform operations comprising:
    determining that a mobile computing device has electrically coupled by physical contact with a docking system that is adapted to supply electrical power for charging the mobile computing device;
    determining that the docking system is a first type of docking system from a plurality of types of docking systems;
    selecting a first user interface profile that corresponds to the first type of docking system from among a plurality of user interface profiles, each of the plurality of user interface profiles corresponding to a respective type of docking system from the plurality of types of docking systems;
    presenting, by the mobile computing device for display, the first user interface profile in response to selecting the first user interface profile;
    presenting, by the mobile computing device for display, a first configuration user interface as part of the first user interface profile,
    wherein the first configuration user interface is a user interface with which a user of the mobile computing device is able to select one or more settings that cause the mobile computing device to (i) transmit to the docking system audio signals that a particular application program on the mobile computing device generates while the mobile computing device is electrically coupled with the docking system, and (ii) mute audio signals that one or more other application programs on the mobile computing device generate while the mobile computing device is electrically coupled with the docking station,
    wherein the mobile computing device is configured to audibly output audio signals that the one or more other application programs on the mobile computing device generate while the mobile computing device is not electrically coupled with the docking station.

21. The one or more computer-readable storage devices of claim 20, wherein determining that the docking system is the first type of docking system includes the mobile computing device communicating with the docking system via a physical electrical connection.

22. The one or more computer-readable storage devices of claim 21, wherein communicating with the docking system includes a transmission of a serial digital signal.

23. The one or more computer-readable storage devices of claim 20, wherein the particular application program is a media player application program.

24. The one or more computer-readable storage devices of claim 20, wherein presenting the first configuration user interface is performed in response to the mobile computing device determining that the mobile computing device has not electrically coupled with the docking system before; the operations further comprising:
    receiving user input, with the first configuration user interface, for activating wireless communication between the mobile computing device and the docking system; and
    storing an indication that wireless communication between the mobile computing device and the docking system is to be activated when the mobile computing device is electrically coupled with the docking system.

25. A computer-implemented method comprising:
    determining that a mobile computing device has electrically coupled by physical contact with a docking system that is adapted to supply electrical power for charging the mobile computing device;
    determining that the docking system is a first type of docking system from a plurality of types of docking system;
    selecting a first configuration user interface that corresponds to the first type of docking system from among a plurality of configuration user interfaces, each of the plurality of configuration user interfaces corresponding to a respective type of docking system from the plurality of types of docking systems;
    determining that the mobile computing device has not electrically coupled with the docking system before;
    presenting, by the mobile computing device for display, the first configuration user interface;
    receiving user input, with the first configuration user interface, for activating wireless communication between the mobile computing device and the docking system,
        wherein the first configuration user interface is a user interface with which a user of the mobile computing device is able to select one or more settings that cause the mobile computing device to (i) transmit to the docking system audio signals that a particular application program on the mobile computing device generates while the mobile computing device is electrically coupled with the docking system, and (ii) mute audio signals that one or more other application programs on the mobile computing device generate while the mobile computing device is electrically coupled with the docking station,
        wherein the mobile computing device is configured to audibly output the audio signals that the one or more other application programs on the mobile computing device generate while the mobile computing device is not electrically coupled with the docking station;
    storing an indication that wireless communication is to be activated when the mobile computing device is electrically coupled with the docking system;
    determining that the mobile computing device has electrically coupled with the docking system a subsequent time;
    presenting, by the mobile computing device for display, a user interface that corresponds to the docking system without presenting the first configuration user interface; and
    establishing wireless communication between the mobile computing device and the docking system based on the stored indication.

26. The method of claim 25, wherein determining that the docking system is the first type of docking system includes the mobile computing device communicating with the docking system via a physical electrical connection.

27. The method of claim 26, wherein communicating with the docking system includes a transmission of a serial digital signal.

28. The method of claim 25, wherein the particular application program is a media player application program.

29. A computer-implemented system comprising:
- a dock detector that is programmed to (i) determine that a mobile computing device has electrically coupled for charging with a docking system that is adapted to supply electrical power to the mobile computing device, and (ii) determine that the docking system is a first type of docking system from a plurality of types of docking system;
- a repository of electronically stored user interface profiles that specify different schemes for presentations of information with the mobile computing device, each user interface profile corresponding to a type of docking system from the plurality of types of docking systems;
- a user interface selector that is programmed to select a first user interface profile from the repository of user interface profiles based on the selected first user interface profile corresponding to the first type of docking system, the first user interface profile being selected for use by the mobile computing device in response to the dock detector determining that the mobile computing device has electrically coupled with the docking system and that the docking system is the first type of docking system; and
- display and input managers that are programmed to (a) present a first configuration user interface as part of the first user interface profile, (b) receive user input, with the first configuration user interface, selecting one or more settings that cause the mobile computing device to (i) transmit to the docking system audio signals that a particular application program on the mobile computing device generates while the mobile computing device is electrically coupled with the docking system, and (ii) mute audio signals that one or more other application programs on the mobile computing device generate while the mobile computing device is electrically coupled with the docking station,
- wherein the mobile computing device is configured to audibly output the audio signals that the one or more other application programs on the mobile computing device generate while the mobile computing device is not electrically coupled with the docking station.

30. The system of claim 29, wherein the dock detector is programmed to determine that the docking system is the first type of docking system using a communication between the docking system and the mobile computing device via a physical electrical connection.

31. The system of claim 30, wherein the communication includes a transmission of a serial digital signal.

32. The system of claim 29, wherein the particular application program is a media player application program.

33. The system of claim 29, wherein:
- the dock detector is further programmed to determine that the mobile computing device has not electrically coupled with the docking system before; and
- the display and input managers are further programmed to:
    - present the first configuration user interface in response to the dock detector determining that the mobile computing device has not electrically coupled with the docking system before,
    - receive user input, with the first configuration user interface, for activating wireless communication between the mobile computing device and the docking system, and
    - cause to be stored an indication that wireless communication between the mobile computing device and the docking system is to be activated when the mobile computing device is electrically coupled with the docking system.

* * * * *

UNITED STATES PATENT AND TRADEMARK OFFICE
CERTIFICATE OF CORRECTION

PATENT NO.        : 8,250,278 B2
APPLICATION NO.   : 13/250263
DATED             : August 21, 2012
INVENTOR(S)       : Erick Tseng, Jaikumar Ganesh and Michael K. Chan It is certified that error appears in the above-identified patent and that said Letters Patent is hereby corrected as shown below:

In the Claims:

Column 50, line 25, in Claim 10, delete "claim 8," and insert -- claim 1, -- therefor.

Signed and Sealed this
Thirteenth Day of November, 2012

David J. Kappos
*Director of the United States Patent and Trademark Office*